(12) United States Patent
Hwang et al.

(10) Patent No.: US 11,134,444 B2
(45) Date of Patent: Sep. 28, 2021

(54) METHOD AND APPARATUS FOR LOW POWER COMMUNICATION IN COMMUNICATION SYSTEM

(71) Applicant: ELECTRONICS AND TELECOMMUNICATIONS RESEARCH INSTITUTE, Daejeon (KR)

(72) Inventors: Sung Hyun Hwang, Daejeon (KR); Kyu Min Kang, Daejeon (KR); Sung Jin Yoo, Daejeon (KR); Su Na Choi, Daejeon (KR); Jae Cheol Park, Daejeon (KR); Yong Ho Kim, Incheon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 16/506,831

(22) Filed: Jul. 9, 2019

(65) Prior Publication Data

US 2020/0015165 A1   Jan. 9, 2020

(30) Foreign Application Priority Data

Jul. 9, 2018 (KR) .................. 10-2018-0079500
Sep. 10, 2018 (KR) .................. 10-2018-0108008
Jul. 8, 2019 (KR) .................. 10-2019-0081928

(51) Int. Cl.
H04J 3/06 (2006.01)
H04W 52/02 (2009.01)
H04W 76/27 (2018.01)

(52) U.S. Cl.
CPC ..... *H04W 52/0229* (2013.01); *H04W 52/0216* (2013.01); *H04W 76/27* (2018.02)

(58) Field of Classification Search
None
See application file for complete search history.

(56) References Cited

U.S. PATENT DOCUMENTS 9,351,250 B2   5/2016   Jafarian et al.
9,686,719 B2   6/2017   Jafarian
(Continued)

FOREIGN PATENT DOCUMENTS

WO   WO2018038532   3/2018
WO   WO2018208058   11/2018

*Primary Examiner* — Gerald A Smarth

(57) ABSTRACT

Disclosed are a low-power communication method and a low-power communication apparatus in a communication system. A low-power station may comprise a processor; a memory storing at least one instruction executable by the processor; a receiver for receiving a WUR PPDU according to the at least one instruction; and a transceiver for transmitting and receiving a legacy PPDU according to the at least one instruction, and the at least one instruction may be configured to cause the receiver to receive a WUR wake-up frame from the access point in an on-duration within a WUR duty cycle period; when the WUR wake-up frame is received, cause the processor to transmit a first signal requesting wake-up to the transceiver; and when the first signal is received, cause the transceiver to transition from a sleep state to a wake-up state at a TWT configured between the access point and the low-power station.

16 Claims, 19 Drawing Sheets

(56) References Cited

U.S. PATENT DOCUMENTS

| | | | |
|---|---|---|---|
| 9,801,133 B2* | 10/2017 | Min | H04L 5/0007 |
| 10,524,304 B2* | 12/2019 | Aboul-Magd | H04W 40/005 |
| 10,609,644 B2* | 3/2020 | Fang | H04W 52/0229 |
| 10,897,739 B2* | 1/2021 | Kim | H04W 52/0235 |
| 2014/0112225 A1 | 4/2014 | Jafarian et al. | |
| 2015/0223001 A1* | 8/2015 | Choi | G01R 29/26 |
| | | | 381/58 |
| 2015/0282157 A1* | 10/2015 | Kim | H04W 48/14 |
| | | | 370/329 |
| 2016/0057605 A1* | 2/2016 | Shellhammer | H04W 52/0229 |
| | | | 370/311 |
| 2016/0249383 A1 | 8/2016 | Kwon et al. | |
| 2016/0374018 A1* | 12/2016 | Min | H04L 5/0053 |
| 2017/0134943 A1* | 5/2017 | Min | G06F 1/3209 |
| 2017/0201941 A1* | 7/2017 | Park | H04W 4/80 |
| 2017/0332327 A1 | 11/2017 | Fang et al. | |
| 2017/0353970 A1 | 12/2017 | Kwon et al. | |
| 2018/0020409 A1* | 1/2018 | Aboul-Magd | H04L 27/2602 |
| 2018/0020410 A1 | 1/2018 | Park | |
| 2018/0049131 A1 | 2/2018 | Huang et al. | |
| 2019/0007901 A1 | 1/2019 | Asterjadhi et al. | |
| 2019/0028967 A1 | 1/2019 | Ahn et al. | |
| 2019/0036754 A1 | 1/2019 | Lee et al. | |
| 2019/0045444 A1 | 2/2019 | Huang et al. | |
| 2019/0045451 A1 | 2/2019 | Huang et al. | |
| 2019/0253965 A1* | 8/2019 | Gan | H04W 52/0206 |
| 2019/0261273 A1* | 8/2019 | Kim | H04W 52/0229 |
| 2019/0274103 A1* | 9/2019 | Gan | H04W 52/0229 |
| 2019/0357143 A1* | 11/2019 | Wang | H04W 52/0229 |
| 2020/0045634 A1* | 2/2020 | Kneckt | H04W 52/0229 |
| 2020/0053648 A1* | 2/2020 | Guo | H04W 52/28 |

* cited by examiner

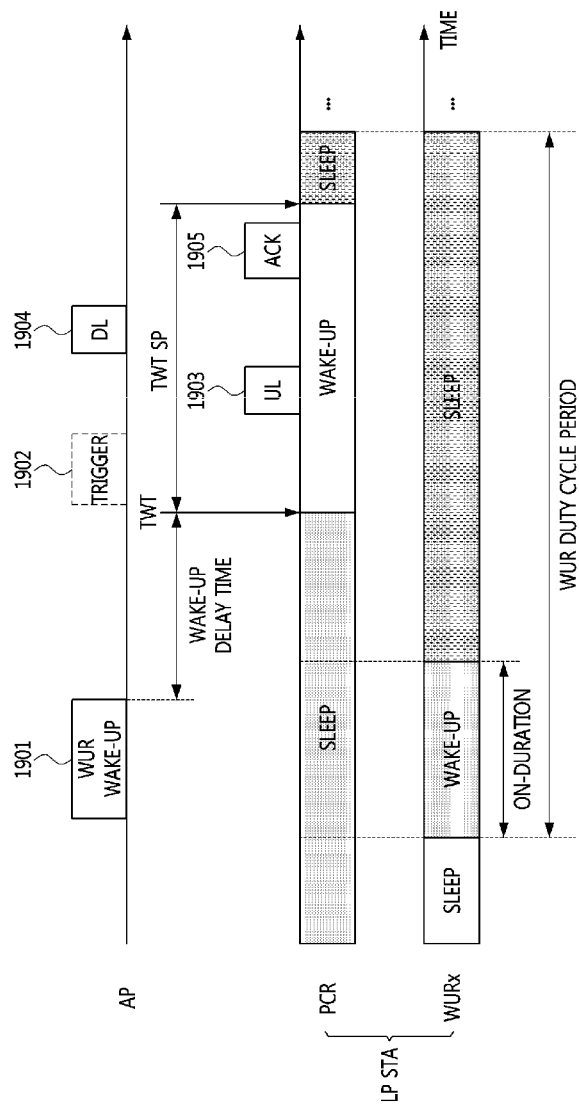

METHOD AND APPARATUS FOR LOW POWER COMMUNICATION IN COMMUNICATION SYSTEM

CROSS-REFERENCE TO RELATED APPLICATIONS

This application claims priorities to Korean Patent Applications No. 10-2018-0079500 filed on Jul. 9, 2018, No. 10-2018-0108008 filed on Sep. 10, 2018, and No. 10-2019-0081928 filed on Jul. 8, 2019 with the Korean Intellectual Property Office (KIPO), the entire contents of which are hereby incorporated by reference.

BACKGROUND

1. Technical Field

The present disclosure relates to wireless local area network (WLAN) technology, and more particularly, to techniques for low-power communication in a wireless local area network.

2. Related Art

With the development of information and communications technology, various wireless communication technologies are under development. Among these wireless communication technologies, a WLAN enables wireless connection to the Internet at a home or business, or in specific service provision areas using a portable terminal, such as a personal digital assistant (PDA), a laptop computer, and a portable multimedia player (PMP), based on radio frequency (RF) technology.

As standards for WLAN technology, the Institute of Electrical and Electronics Engineers (IEEE) 802.11 standards are under development. The IEEE 802.11a provides a transmission speed of 54 Mbps using an unlicensed band at 5 GHz. The IEEE 802.11b provides a transmission speed of 11 Mbps using direct sequence spread spectrum (DSSS) at 2.4 GHz. The IEEE 802.11g provides a transmission speed of 54 Mbps using orthogonal frequency division multiplexing (OFDM) at 2.4 GHz.

The WLAN technology according to the IEEE 802.11n standard operates in the 2.4 GHz band and the 5 GHz band based on an orthogonal frequency division multiplexing (OFDM) scheme, and when multiple input multiple output (MIMO)-OFDM is used, a transmission speed of up to 300 Mbps can be provided through four spatial streams. Also, the WLAN technology according to the IEEE 802.11n standard can support a channel bandwidth of up to 40 MHz and can provide a transmission speed of up to 600 Mbps in this case.

With the proliferation of such WLANs and the diversification of applications using WLANs, there is an increasing necessity for new WLAN technology for supporting a higher throughput than a data processing speed of IEEE 802.11n. Very high throughput (VHT) WLAN technology is one of the IEEE 802.11 WLAN technologies proposed to support a data processing speed of 1 Gbps or higher. Among these WLAN technologies, IEEE 802.11ac is being developed as a standard for providing VHT in a 5 GHz or lower band, and IEEE 802.11ad is being developed as a standard for providing VHT in a 60 GHz band. Also, the WLAN technology according to the IEEE 802.11ax standard aims at improving the frequency efficiency in a dense environment.

Since a communication node (e.g., access point (access point), station (station), etc.) supporting the WLAN technology operates dependent on the battery, a low-power operation method will be needed to operate for a long time. In order to support the low-power operation, the communication node may include a receiver for the low-power operation, a transceiver for basic operations according to the IEEE 802.11, and the like. In order to perform the low-power operation during a waiting time of a downlink signal indicating presence or absence of a packet to be transmitted, the receiver for the low-power operation may operate in a wake-up state and the transceiver may operate in a sleep state. At this time, low-power communication methods, interworking methods for the low-power operation in a conventional WLAN using the transceiver, and detailed communication methods in a multi-user environment are needed.

SUMMARY

Accordingly, embodiments of the present disclosure provide a low-power communication method and a low-power communication apparatus based on a duty cycle operation and a target wake time (TWT) operation in a WLAN.

According to embodiments of the present disclosure, a low-power station in a communication system may comprise a processor; a memory storing at least one instruction executable by the processor; a receiver for receiving a wake-up radio (WUR) physical layer protocol data unit (PPDU) according to the at least one instruction; and a transceiver for transmitting and receiving a legacy PPDU according to the at least one instruction. Also, when executed by the processor, the at least one instruction may be configured to cause the receiver to receive a WUR wake-up frame from the access point in an on-duration within a WUR duty cycle period; when the WUR wake-up frame is received, cause the processor to transmit a first signal requesting wake-up to the transceiver; and when the first signal is received, cause the transceiver to transition from a sleep state to a wake-up state at a target wake time (TWT) configured between the access point and the low-power station.

The at least one instruction may be further configured to cause the transceiver to transmit to the access point first information indicating that the low-power station supports a TWT function.

The at least one instruction may be further configured to cause the transceiver to transmit to the access point second information requesting to perform a TWT operation, and the second information may be transmitted in a negotiation procedure for a WUR mode between the access point and the low-power station.

The at least one instruction may be further configured to cause the transceiver to maintain the wake-up state for a TWT service period (SP) configured between the access point and the low-power station.

The TWT and the TWT SP may be configured in a negotiation procedure for a WUR mode between the access point and the low-power station.

The at least one instruction may be further configured to cause the transceiver to transmit and receive a legacy PPDU with the access point during the TWT SP; and when the TWT SP is terminated, cause the transceiver to transition from the wake-up state to the sleep state.

The WUR wake-up frame may be received earlier than the TWT at least by a wake-up delay time of the transceiver.

The legacy PPDU may be a non-high throughput (non-HT) PPDU, an HT PPDU, a very high throughput (VHT) PPDU, or a high efficiency (HE) PPDU.

The WUR wake-up frame may be used for waking up a plurality of low-power stations, and may include an identifier (ID) of each of the plurality of low-power stations.

A MAC header of the WUR wake-up frame may include information indicating a number of the plurality of low-power stations, and the ID of each of the plurality of low-power stations may be included in a frame body of the WUR wake-up frame.

Furthermore, according to embodiments of the present disclosure, a low-power station in a communication system may comprise a processor; a memory storing at least one instruction executable by the processor; a receiver for receiving a wake-up radio (WUR) physical layer protocol data unit (PPDU) according to the at least one instruction; and a transceiver for transmitting and receiving a legacy PPDU according to the at least one instruction. Also, when executed by the processor, the at least one instruction may be configured to cause the processor to transmit to the transceiver a first signal requesting wake-up earlier than a target wake time (TWT) configured between the access point and the low-power station at least by a wake-up delay time of the transceiver; when the first signal is received, cause the transceiver to transition from a sleep state to a wake-up state at the TWT; and cause the transceiver to maintain the wake-up state for a TWT service period (SP) configured between the access point and the low-power station.

The at least one instruction may be further configured to cause the transceiver to transmit to the access point first information indicating that the low-power station supports a TWT function.

The at least one instruction may be further configured to cause the transceiver to transmit to the access point second information requesting to perform a TWT operation, and the second information may be transmitted in a negotiation procedure for a WUR mode between the access point and the low-power station.

The TWT and the TWT SP may be configured in a negotiation procedure for a WUR mode between the access point and the low-power station.

The at least one instruction may be further configured to cause the transceiver to transmit and receive a legacy PPDU with the access point during the TWT SP; and when the TWT SP is terminated, cause the transceiver to transition from the wake-up state to the sleep state.

The WUR wake-up frame may be used for waking up a plurality of low-power stations, a medium access control (MAC) header of the WUR wake-up frame may include information indicating a number of the plurality of low-power stations, and a frame body of the WUR wake-up frame may include an identifier (ID) of each of the plurality of low-power stations.

Furthermore, according to embodiments of the present disclosure, an operation method of an access point may comprise receiving from a low-power station a wake-up radio (WUR) mode request frame including first information requesting to perform a target wake time (TWT) operation; transmitting to the low-power station a WUR mode response frame including second information indicating that execution of the TWT operation is approved; and transmitting a WUR wake-up frame to the low-power station earlier than a TWT at least by a wake-up delay time of the low-power station.

The WUR mode response frame may further include third information indicating the TWT and fourth information indicating a TWT service period (SP).

The operation method may further comprise transmitting and receiving a legacy physical protocol data unit (PPDU) with the low-power station during the TWT SP, and the legacy PPDU may be a non-high throughput (non-HT) PPDU, an HT PPDU, a very high throughput (VHT) PPDU, or a high efficiency (HE) PPDU.

The WUR wake-up frame may be used for waking up a plurality of low-power stations, a medium access control (MAC) header of the WUR wake-up frame may include information indicating a number of the plurality of low-power stations, and a frame body of the WUR wake-up frame may include an identifier (ID) of each of the plurality of low-power stations.

According to the embodiments of the present disclosure, the target wake time (TWT) and the TWT service period (SP) can be configured between the access point and the low-power station. In this case, the primary connectivity radio (PCR) of the low-power station can transition from the sleep state to the wake-up state at the TWT within the WUR duty cycle period, and maintain the wake-up state for the TWT SP. In order to support the TWT operation, the access point may transmit a wake-up radio (WUR) wake-up frame earlier than the TWT at least by a wake-up delay time. Therefore, power consumption can be reduced in the WLAN-based communication system.

In addition, a multi-user (MU) WUR wake-up frame may be introduced in the WLAN-based communication system. In this case, the access point can wake up a plurality of low-power stations by transmitting a single MU WUR wake-up frame. Accordingly, the performance of the WLAN-based communication system can be improved.

BRIEF DESCRIPTION OF DRAWINGS

Embodiments of the present disclosure will become more apparent by describing in detail embodiments of the present disclosure with reference to the accompanying drawings, in which:

FIG. 18 is a block diagram illustrating a first embodiment of a WUR mode request frame in a WLAN-based communication system;

FIG. 19 is a timing chart illustrating a first embodiment of a low-power communication operation according to a TWT function in a WLAN-based communication system;

DETAILED DESCRIPTION

Figure 1:
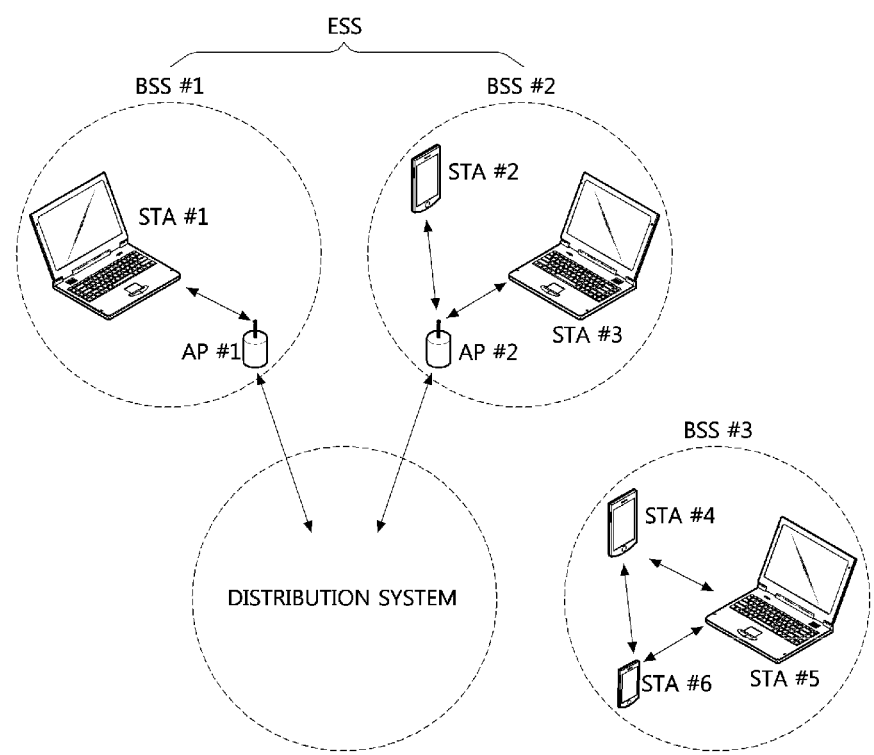
FIG. 1 is a conceptual diagram illustrating a first embodiment of a WLAN-based communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Embodiments described in the present specification may be applied to a communication system (e.g., a wireless local area network (WLAN) based communication system) according to the Institute of Electrical and Electronics Engineers (IEEE) 802.11 standard. Also, the embodiments described in the present specification may be applied to other communication systems as well as the communication systems conforming to the IEEE 802.11 standard. For example, the embodiments described in the present specification may be applied to wireless personal area network (WPAN) based communication systems, wireless body area network (WBAN) based communication systems, 4G communication systems (e.g., long term evolution (LTE) based communication system, LTE-Advanced (LTE-A) based communication system), 5G communication system (e.g., new radio (NR) communication system), or the like.

In the WLAN-based communication system, a station (STA) may refer to a communication node performing functions of a medium access control (MAC) layer and functions of a physical layer on a wireless medium which are defined in the IEEE 802.11 standard. The station may be classified into an access point (AP) station and a non-access point station. The access point station may simply be referred to as an access point, and the non-access point station may simply be referred to as a station. Also, the access point may be referred to as a base station (BS), a node B, an evolved node B, a relay, a radio remote head (RRH), a transmission and reception point (TRP), or the like. The station may be referred to as a terminal, a wireless transmit/receive unit (WTRU), a user equipment (UE), a device, or the like and may be a smart phone, a tablet PC, a laptop computer, a sensor device, or the like.

FIG. 1 is a conceptual diagram illustrating a first embodiment of a WLAN-based communication system.

Referring to FIG. 1, a WLAN-based communication system according to the IEEE 802.11 standard may include at least one basic service set (BSS). The BSS may indicate a set of communication nodes (e.g., access points #1-2, stations #1-6, etc.). The BSS may be classified into an infrastructure BSS and an independent BSS (IBSS). Here, each of BSSs #1-2 may be an infrastructure BSS, and the BSS #3 may be an IBSS.

The BSS #1 may include a station #1, an access point #1 connected to a distribution system, and the like. Also, the BSS #1 may further include the distribution system. The communications between the station #1 and the access point #1 may be performed based on the IEEE 802.11 standard in the BSS #1. The BSS #2 may include a station #2, a station #3, an access point #2 connected to a distribution system, and the like. Also, the BSS #2 may further include the distribution system. The communications between the station #2 and the access point #2, the communications between the station #3 and the access point #2, and the like may be performed based on the IEEE 802.11 standard in the BSS #2. The communications between stations (e.g., stations #1-3) in the BSS #1 or BSS #2 may be performed through the access point (e.g., access points #1-2). However, when a direct link is established between stations (e.g., station #1-3), direct communications between the stations (e.g., station #1-3) may be performed.

The BSS #3 may be an IBSS operating in an ad-hoc mode. There may not be an access point which is an entity that performs a management function in the BSS #3. In the BSS #3, stations (e.g., stations #4-6) may be managed in a distributed manner. The stations (e.g., stations #4-6) may form a self-contained network since connections to the distribution system are not allowed in the BSS #3.

The plurality of BSSs (e.g., BSSs #1-2) may be interconnected via the distribution system. The plurality of BSSs connected through the distribution system may be referred to as an extended service set (ESS). The communication nodes (e.g., access points #1-2, stations #1-3) included in the ESS may communicate with each other, and stations (e.g., station #1-3) belonging to the same ESS may move between BSSs (e.g., BSSs #1-2) while performing seamless communications.

The communication node (e.g., access point, station, etc.) belonging to the WLAN-based communication system may be configured as follows.

Figure 2:
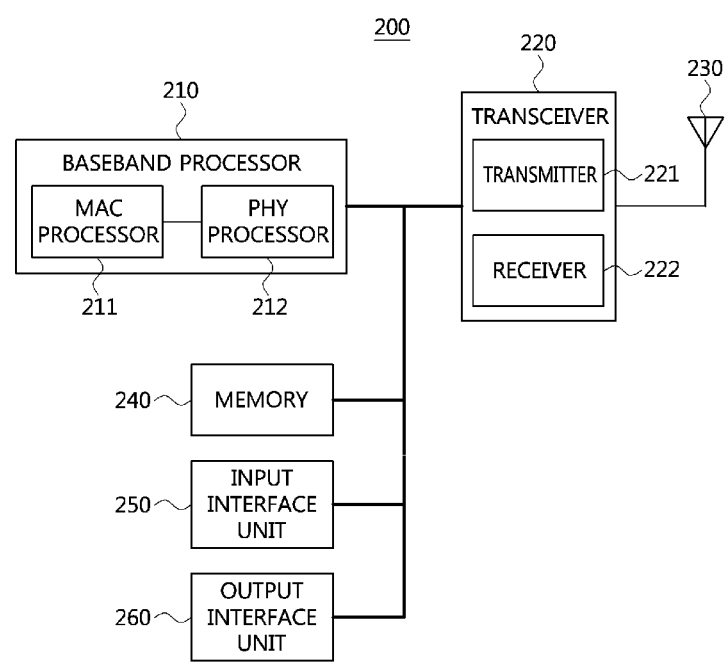
FIG. 2 is a block diagram illustrating a first embodiment of a communication node belonging to a WLAN-based communication system.

FIG. 2 is a block diagram illustrating a first embodiment of a communication node belonging to a WLAN-based communication system.

Referring to FIG. 2, a communication node 200 may include a baseband processor 210, a transceiver 220, an antenna 230, a memory 240, an input interface unit 250, an output interface unit 260, and the like. The baseband processor 210 may perform baseband-related signal processing, and may include a MAC processor 211 and a PHY processor 212. The MAC processor 211 may perform functions of the MAC layer defined in the IEEE 802.11 standard and the PHY processor 212 may perform functions of the PHY layer defined in the IEEE 802.11 standard.

The transceiver 220 may include a transmitter 221 and a receiver 222. The antenna 230 may be configured as an antenna array to support multiple-input multiple-output (MIMO). The memory 240 may store instructions executed by the baseband processor 210 and may comprise at least one of a read only memory (ROM) and a random access memory (RAM). The input interface unit 250 may obtain information from a user of the communication node 200 and the output interface unit 260 may provide information to the user of the communication node 200. The baseband processor 210, the transceiver 220, the memory 240, the input interface unit 250 and the output interface unit 260 may be connected to each other via a bus.

Meanwhile, the communication node (e.g., access point, station, etc.) belonging to the WLAN-based communication system may perform transmission and reception of a frame based on a point coordination function (PCF), a hybrid coordination function (HCF), a HCF controlled channel access (HCCA) function, an enhanced distributed channel access (EDCA) function, or the like.

In the WLAN-based communication system, a frame may be classified into a management frame, a control frame, and a data frame. The management frame may include an association request frame, an association response frame, a reassociation request frame, a reassociation response frame, a probe request frame, a probe response frame, a beacon frame, a disassociation frame, an authentication frame, a deauthentication frame, an action frame, and the like.

The control frame may include an acknowledgment (ACK) frame, a block ACK request (BAR) frame, a block ACK (BA) frame, a power saving (PS)-Poll frame, a request to send (RTS) frame, a clear to send (CTS) frame, and the like. The data frame may be classified into a quality of service (QoS) data frame and a non-QoS data frame. The QoS data frame may indicate a data frame requiring transmission according to the QoS, and the non-QoS data frame may indicate a data frame not requiring transmission according to the QoS.

Figure 3:
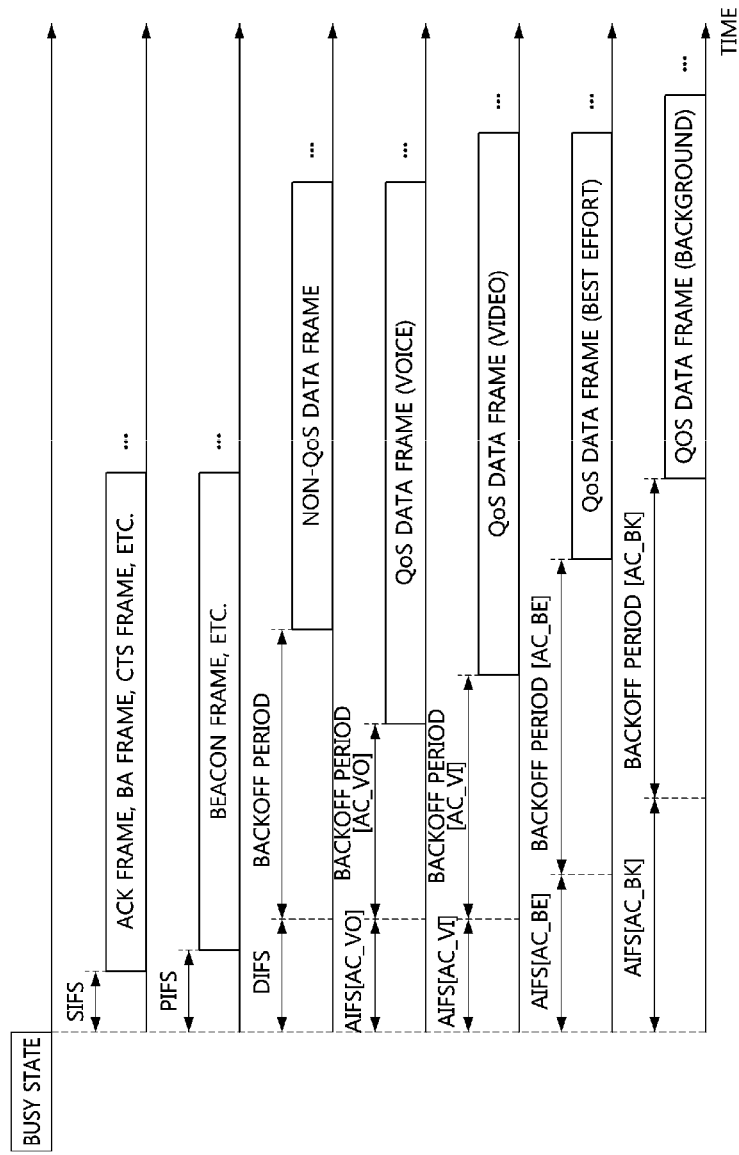
FIG. 3 is a timing diagram illustrating a first embodiment of an operation method of a communication node based on EDCA.

FIG. 3 is a timing diagram illustrating a first embodiment of an operation method of a communication node based on EDCA.

Referring to FIG. 3, a communication node desiring to transmit a control frame (or a management frame) may perform a channel state monitoring operation (e.g., carrier sensing operation) during a predetermined period (e.g., short interframe space (SIFS) or PCF IFS (PIFS)), and when the channel state is determined to be idle during the predetermined period (e.g., SIFS or PIFS), the communication node may transmit the control frame (or the management frame). For example, the communication node may transmit an ACK frame, a BA frame, a CTS frame, or the like when the channel state is determined to be idle during SIFS. Also, the communication node may transmit a beacon frame or the like when the channel state is determined to be idle during the PIFS. On the other hand, when it is determined that the channel state is busy during the predetermined period (e.g., SIFS or PIFS), the communication node may not transmit the control frame (or the management frame). Here, the carrier sensing operation may refer to a clear channel assessment (CCA) operation.

A communication node desiring to transmit a non-QoS data frame may perform a channel state monitoring operation (e.g., carrier sensing operation) during DCF IFS (DIFS), and when the channel state is determined to be idle during the DIFS, the communication node may perform a random backoff procedure. For example, the communication node may select a backoff value (e.g., a backoff counter) within a contention window according to the random backoff procedure and may perform a channel state monitoring operation (e.g., carrier sensing operation) during a period corresponding to the selected backoff value (hereinafter, referred to as 'backoff period'). The communication node may transmit the non-QoS data frame when the channel state is determined to be idle in the backoff period.

A communication node desiring to transmit a QoS data frame may perform a channel state monitoring operation (e.g., carrier sensing operation) during an arbitration IFS (AIFS), and when the channel state is determined to be idle during the AIFS, the communication node may perform a random backoff procedure. The AIFS may be configured according to an access category (AC) of a data unit (e.g., protocol data unit (PDU)) included in the QoS data frame. The AC of the data unit may be as shown in Table 1 below.

TABLE 1

| Priority | AC | Description |
|---|---|---|
| Lowest | AC_BK | Background |
| Highest | AC_BE | Best effort |
|  | AC_VI | Video |
|  | AC_VO | Voice |

AC_BK may indicate background data, AC_BE may indicate data transmitted in the best effort manner, AC_VI may indicate video data, and AC_VO may indicate voice data. For example, the length of the AIFS for the QoS data frame corresponding to each of AC_VO and AC_VI may be configured to be equal to the length of the DIFS. The length of the AIFS for the QoS data frame corresponding to each of AC_BE and AC_BK may be configured to be longer than the length of the DIFS. Here, the length of the AIFS for the QoS data frame corresponding to AC_BK may be configured to be longer than the length of the AIFS for the QoS data frame corresponding to AC_BE.

In the random backoff procedure, the communication node may select a backoff value (e.g., a backoff counter) within a contention window according to the AC of the QoS data frame. The contention window according to the AC may be as shown in Table 2 below. $CW_{min}$ may indicate a minimum value of the contention window, $CW_{max}$ may indicate a maximum value of the contention window, and each of the minimum value and the maximum value of the contention window may be represented by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may perform a channel state monitoring operation (e.g., carrier sensing operation) in the backoff period and may transmit the QoS data frame when the channel state is determined to be idle in the backoff period.

Figure 4:
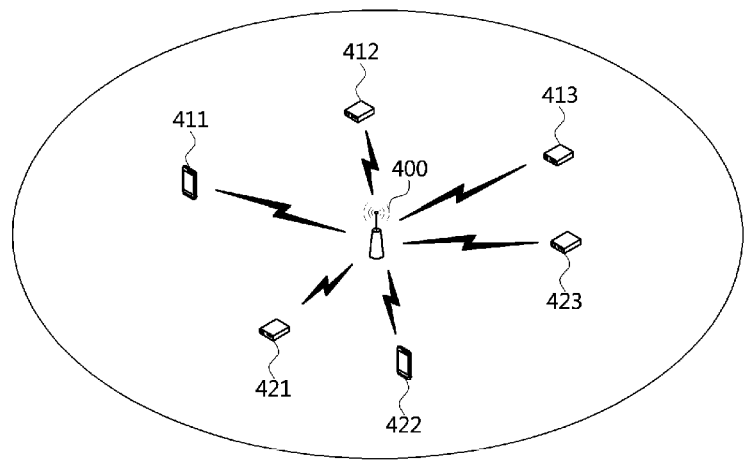
FIG. 4 is a conceptual diagram illustrating a second embodiment of a WLAN-based communication system.

FIG. 4 is a conceptual diagram illustrating a second embodiment of a WLAN-based communication system.

Referring to FIG. 4, a WLAN-based communication system may include an access point 400, stations supporting a low-power operation (hereinafter referred to as 'low-power station') 411, 412 and 413, stations 421, 422 and 423 which do not support a wake-up radio (WUR) mode (hereinafter referred to as 'legacy station'), and the like. The low-power stations 411, 412 and 413 and the legacy stations 421, 422 and 423 may belong to coverage of the access point 400, and the access point 400 may provide communication services to the low-power stations 411, 412 and 413 and the legacy stations 421, 422 and 423. The low-power station #1 411 and the legacy station #2 422 may be smart phones, and the low-power station #2 412, the low-power station #3 413, the legacy station #1 421, and the legacy station #3 423 may be sensor devices.

The access point 400 may support communication protocols used by the low-power stations 411, 412, and 413 and the legacy stations 421, 422, and 423, respectively. The low-power stations 411, 412, and 413 may use communication protocols defined in the IEEE 802.11ba standard. Also, the low-power stations 411, 412, and 413 may use communication protocols defined in other standards such as IEEE 802.11a/b/g/n/p/ac/ax/ad/ay, etc. as well as the communication protocol defined in the IEEE 802.11ba standard. The legacy stations 421, 422 and 423 may use the communication protocols defined in standards (e.g., IEEE 802.11a/b/g/n/p/ac/ax/ay, etc.) other than IEEE 802.11ba standard.

The legacy stations 421, 422 and 423 may be configured the same or similar to the communication node 200 shown in FIG. 2, and the low-power stations 411, 412 and 413 may be configured as follows.

Figure 5:
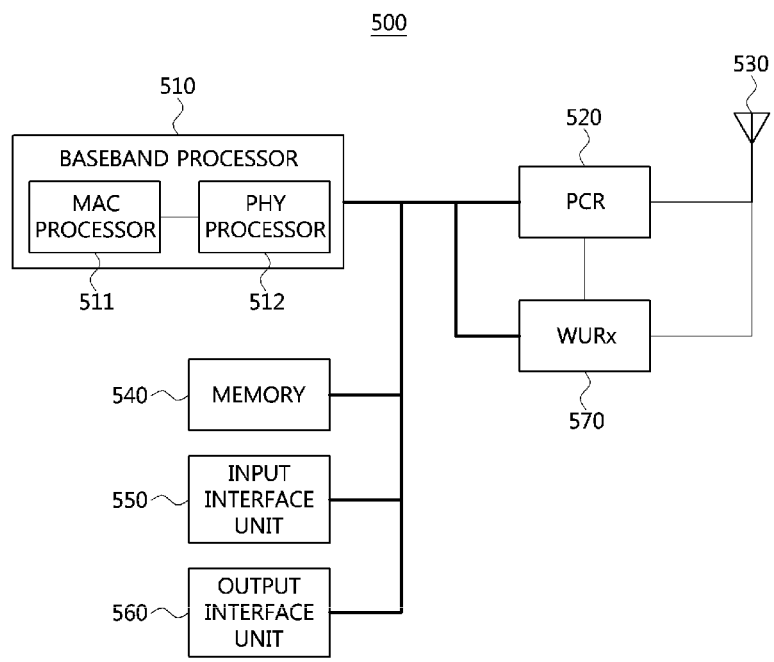
FIG. 5 is a block diagram illustrating a first embodiment of a low-power station in a WLAN-based communication system.

FIG. 5 is a block diagram illustrating a first embodiment of a low-power station in a WLAN-based communication system.

Referring to FIG. 5, a low-power station 500 may include a baseband processor 510, a primary connectivity radio (PCR) 520, an antenna 530, a memory 540, an input interface unit 550, an output interface unit 560, a wake-up receiver (WURx) 570, and the like. For example, the low-power station 500 may further include the WURx 570 as compared to the communication node 200 of FIG. 2. The functions of each of the baseband processor 510, the PCR 520, the antenna 530, the memory 540, the input interface unit 550, and the output interface unit 560 included in the low-power station 500 may be the same as or similar to the functions of each of the baseband processor 210, the transceiver 220, the antenna 230, the memory 240, the input interface unit 250, and the output interface unit 260 included in the communication node 200 of FIG. 2.

The PCR 520 of the low-power station 500 may be referred to as a 'transceiver', and the WURx 570 of the low-power station 500 may be referred to as a 'receiver'. The PCR 520 of the low-power station 500 can transmit or receive a non-high throughput (non-HT) physical protocol data unit (PPDU), an HT PPDU, a very high throughput (VHT) PPDU, or a high efficiency (HE) PPDU. The non-HT PPDU, the HT PPDU, the VHT PPDU, or the HE PPDU may be a legacy PPDU (e.g., legacy frame). The WURx 570 of the low-power station 500 can receive a WUR PPDU (e.g., WUR frame).

That is, the low-power station 500 may be a non-HT station, an HT station, a VHT station, or an HE station, which can transmit and receive the WUR PPDU. The WURx 570 may be located in the PCR 520 or may be configured independently of the PCR 520. The WURx 570 and the PCR 520 may share the same antenna 530. Alternatively, the antenna for the WURx 570 may be configured separately from the antenna for the PCR 520. For example, the low-power station 500 may include a first antenna (not shown) for the WURx 570 and a second antenna (not shown) for the PCR 520. The communications between the WURx 570 and the PCR 520 may be performed using a primitive signal, a signal according to an application protocol interface (API), or the like.

The WURx 570 may operate in a narrow band (e.g., 4 MHz, 8 MHz, 16 MHz, etc.) and the power consumption of the low-power station 500 including the WURx 570 may be less than 1 mW. The WURx 570 may receive an on-off keying (OOK) modulated signal (e.g., a WUR wake-up frame) and perform demodulation on the received signal to verify information included in the received signal. The PCR 520 may transmit and receive frames (e.g., control frames, management frames, data frames) defined in the IEEE 802.11 standard and may operate in at least one of the 2.4

GHz frequency band and the 5 GHz frequency band. Also, the PCR 520 may support 20 MHz bandwidth, 40 MHz bandwidth, 80 MHz bandwidth, 160 MHz bandwidth, or the like.

Each of the PCR 520 and the WURx 570 may operate in a wake-up state or a sleep state. The wake-up state may indicate a state in which power is supplied to the corresponding entity (e.g., PCR 520 or WURx 570), and may be referred to as "on state", "activation state", "enable state", "awake state", or the like. The sleep state may indicate a state in which no power or a minimum power is supplied to the corresponding entity (e.g., PCR 520 or WURx 570), and may be referred to as "off state", "deactivation state", "disable state", "doze state", or the like.

The low-power station 500 may support a normal mode in which the WURx is not used and a WUR mode in which the WURx is activated to be used. Additionally, the low-power station 500 may support a WUR mode suspend. Even when parameters for the WUR operation are configured, the low-power station 500 may operate in the WUR mode suspend in which the conventional low-power operation of the PCR is performed.

In the normal mode, the low-power station 500 may perform the PCR operation without using the WURx, and may operate in the same or similar manner as the communication node 200 of FIG. 2.

In the WUR mode, when the PCR 520 of the low-power station 500 operates in the wake-up state, the WURx 570 of the low-power station 500 may operate in the sleep state. For example, the PCR 520 operating in the wake-up state may perform a transmission and reception procedure of a frame (e.g., legacy frame, legacy signal) with another communication node. On the other hand, when the PCR 520 of the low-power station 500 operates in the sleep state, the WURx 570 of the low-power station 500 may operate in the wake-up state. In this case, the WURx 570 operating in the wake-up state may perform a channel state monitoring operation (e.g., carrier sensing operation) to receive a WUR wake-up frame. Here, the WUR wake-up frame may request the PCR 520 of the low-power station 500 to operate in the wake-up state.

When the low-power station 500 operating in the WUR mode receives the WUR wake-up frame from another communication node, the WURx 570 may transmit to the PCR 520 a wake-up indicator requesting the PCR 520 to operate in the wake-up state. When the wake-up indicator is received from the WURx 570, the operation state of the PCR 520 may transition from the sleep state to the wake-up state. When the wake-up indicator is transmitted to the PCR 520 or when the operation state of the PCR 520 transitions from the sleep state to the wake-up state, the operation state of the WURx 570 may transition from the wake-up state to the sleep state. Alternatively, the operation state of the WURx 570 may transition from the wake-up state to the sleep state when a sleep indicator requesting the WURx 570 to operate in the sleep state is received from the PCR 520. Here, a time required for the PCR 520 to transition from the sleep state to the wake-up state may be referred to as a 'state transition time'. For example, the state transition time may indicate a time from the reception of the WUR wake-up frame to a time when the PCR 520 of the low-power station operates in the wake-up state.

When the operation of frame transmission and reception is completed, the operation state of the PCR 520 may transition from the wake-up state to the sleep state. In this case, the PCR 520 may transmit to the WURx 570 a wake-up indicator requesting the WURx 570 to operate in the wake-up state. When the wake-up indicator is received from the PCR 520, the operation state of the WURx 570 may transition from the sleep state to the wake-up state. When the wake-up indicator is transmitted to the WURx 570 or when the operation state of the WURx 570 transitions from the sleep state to the wake-up state, the operation state of the PCR 520 may transition from the wake-up state to the sleep state.

In the WUR mode suspend, the low-power station 500 may operate in the same or similar manner as the normal mode without performing the WUR operation. In this case, the low-power station 500 may store the WUR parameters negotiated for the WUR operation in the memory 540 without deleting the WUR parameters for the WUR operation.

Also, the baseband processor 510 (e.g., a MAC processor 511 included in the baseband processor 510) may operate in the wake-up state or the sleep state based on the operation state of the PCR 520. For example, the baseband processor 510 (e.g., the MAC processor 511) may also operate in the wake-up state when the PCR 520 operates in the wake-up state, and the baseband processor 510 (e.g., the MAC processor 511) may also operate in the sleep state when the PCR 520 operates in the sleep state. For example, when a wake-up indicator requesting to operate in the wake-up state is received from the PCR 520 operating in the wake-up state, the operation state of the baseband processor 510 (e.g., MAC processor 511) may transition from the sleep state to the wake-up state. When a sleep indicator requesting to operate in the sleep state is received from the PCR 520 to operate in the sleep state, the operation state of the baseband processor 510 (e.g., MAC processor 511) may transition from the wake-up state to the sleep state. Alternatively, the baseband processor 510 may always operate in the wake-up state regardless of the operation state of the PCR 520.

Meanwhile, an access point supporting low-power operations may be configured the same or similar to the low-power station 500 described above. For example, the access point may include the baseband processor 510, the PCR 520, the antenna 530, the memory 540, the input interface unit 550, the output interface unit 560, the WURx 570, and the like. Also, the access point may include a wake-up transmitter (WUTx) (not shown) instead of the WURx 570, or may include a wake up radio (WUR) that performs the functions of WURx 570 and the WUTx. The WUTx may perform operations corresponding to the WURx 570. For example, WUTx may operate in a narrow band (e.g., 4 MHz, 8 MHz, 16 MHz, etc.). The WUTx may transmit an OOK modulated signal (e.g., WUR wake-up frame). Also, the low-power station 500 may further include a WUTx corresponding to the WURx 570. The access point supporting the low-power operation may be a non-HT access point, an HT access point, a VHT access point, or an HE access point.

Figure 6:
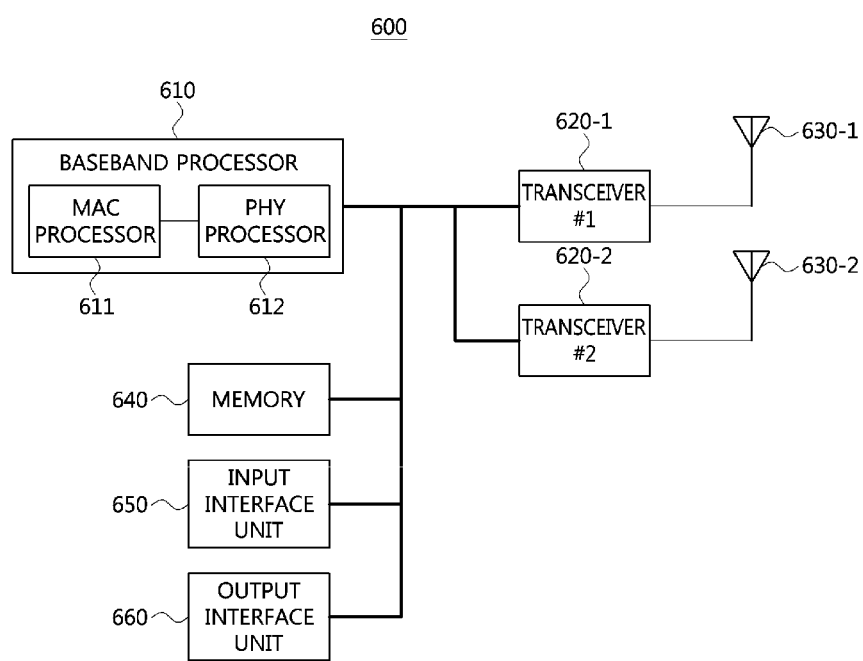
FIG. 6 is a block diagram illustrating a second embodiment of a low-power station in a WLAN-based communication system.

FIG. 6 is a block diagram illustrating a second embodiment of a low-power station in a WLAN-based communication system.

Referring to FIG. 6, a low-power station 600 may include a baseband processor 610, a transceiver #1 620-1, a transceiver #2 620-2, an antenna #1 630-1, an antenna #2 630-2, a memory 640, an input interface unit 650, an output interface unit 660, and the like. For example, the low-power station 600 may further include the transceiver #2 620-2 and the antenna #2 630-2 as compared to the communication node 200 of FIG. 2. The functions of each of the baseband processor 610, the transceiver #1 620-1, the antenna #1 630-1, the memory 640, the input interface unit 650, and the output interface unit 660 included in the low-power station 600 may be the same as or similar to the functions of each of the baseband processor 210, the transceiver 220, the antenna 230, the memory 240, the input interface unit 250, and the output interface unit 260 included in the communication node 200 of FIG. 2. The transceiver #1 620-1 and the transceiver #2 620-2 may be referred to as a PCR #1 and a PCR #2, respectively.

The functions of each of the transceiver #2 620-2 and the antenna #2 630-2 included in the low-power station 600 may be the same as those of the transceiver 220 and the antenna 230 included in the communication node 200 of FIG. 2. Alternatively, the functions of the transceiver #1 620-1 included in the low-power station 600 may be the same as or similar to the functions of the PCR 520 included in the communication node 500 of FIG. 5, and the functions of the transceiver #2 620-2 included in the low-power station 600 may be the same as or similar to the functions of the WURx 570 included in the communication node 500 of FIG. 5. The communication between the transceiver #1 620-1 and the transceiver #2 620-2 may be performed using a primitive signal, a signal according to API, or the like. The low-power station 600 may be a non-HT station, an HT station, a VHT station, or an HE station.

An access point supporting low-power operation may be configured to be the same as or similar to the low-power station 600 described above. For example, the access point may include the baseband processor 610, the transceiver #1 620-1, the transceiver #2 620-2, the antenna #1 630-1, the antenna #2 630-2, the memory 640, the input interface unit 650, the output interface unit 660, and the like. The access point supporting the low-power operation may be a non-HT access point, an HT access point, a VHT access point, or an HE access point.

Meanwhile, in the WLAN-based communication system, a frequency band supported by the PCR of the communication node (e.g., access point, station) may be 10 MHz, 20 MHz, 40 MHz, 80 MHz, 160 MHz, or the like according to the IEEE 802.11 standard (e.g., IEEE 802.11a/b/g/n/p/ac/ad/ax/ay). Also, in the frequency band supported by the PCR, one channel (CH) may include a plurality of subchannels (SUB-CHs). Here, the number of subchannels and the bandwidth of each subchannel may differ depending on the IEEE 802.11 standard (e.g., IEEE 802.11a/b/g/n/p/ac/ad/ax/ay). For example, in the WLAN-based communication system supporting the IEEE 802.11ax standard, a channel having a bandwidth of 20 MHz may include up to 9 subchannels according to the size of a resource unit (RU) allocated to a subchannel.

In the WLAN-based low-power communication system, a channel may be configured as follows.

Figure 7:
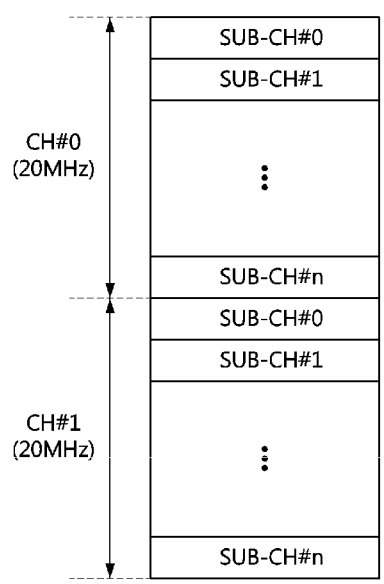
FIG. 7 is a conceptual diagram illustrating a first embodiment of channel configuration in a WLAN-based communication system.

FIG. 7 is a conceptual diagram illustrating a first embodiment of channel configuration in a WLAN-based communication system.

Referring to FIG. 7, a WURx of a communication node (e.g., access point, low-power station) may support a frequency band of 20 MHz or a frequency band smaller than 20 MHz (e.g., 4 MHz, 8 MHz, 16 MHz, etc.). Also, a channel used by the WURx may comprise a plurality of subchannels, and a bandwidth of each of the plurality of subchannels may be less than the bandwidth supported by the PCR. For example, the 40 MHz frequency band may be comprised of a channel #0 and a channel #1, and when the bandwidth of the subchannel is 4 MHz, each of the channel #0 and the channel #1 may comprise 3 or 4 subchannels. Here, a guard band (GB) for protecting each subchannel may be located between the subchannels.

Hereinafter, operation methods of communication nodes (e.g., access point, station, etc.) supporting low-power operations in a WLAN-based communication system will be described. Even when a method (e.g., transmission or reception of a frame) performed at a first communication node among the communication nodes is described, a corresponding second communication node may perform a method (e.g., reception or transmission of the frame) corresponding to the method performed at the first communication node. That is, when an operation of the station is described, the corresponding access point may perform an operation corresponding to the operation of the station. Conversely, when an operation of the access point is described, the corresponding station may perform an operation corresponding to the operation of the access point.

Figure 8:
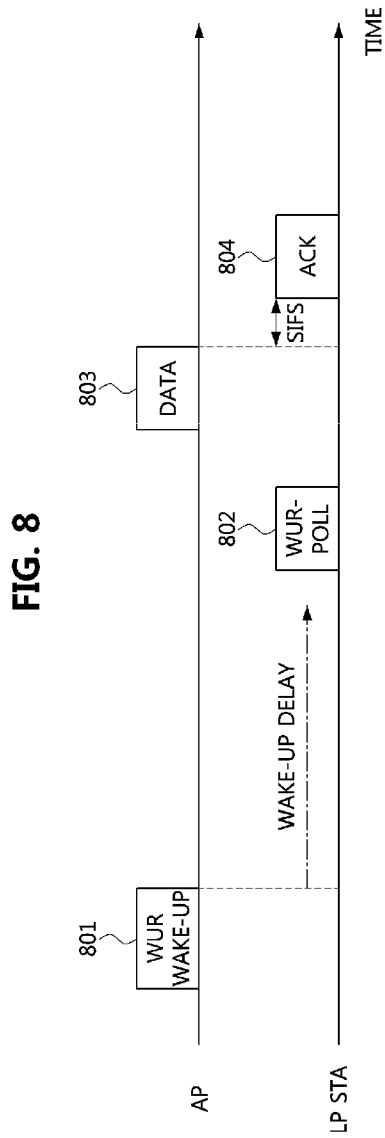
FIG. 8 is a timing diagram illustrating a first embodiment of an operation method of a communication node in a WLAN-based communication system.

FIG. 8 is a timing diagram illustrating a first embodiment of an operation method of a communication node in a WLAN-based communication system.

Referring to FIG. 8, a WLAN-based communication system may include an access point (AP), a low-power station (LP STA), and the like. The low-power station may belong to the coverage of the access point, and may be connected to the access point. The access point and the low-power station may be configured to be the same as or similar to the low-power station 500 of FIG. 5. Also, the access point and low-power station may further include a WUTx as compared to the low-power station 500 of FIG. 5. Alternatively, the access point and low-power station may be configured to be the same as or similar to the low-power station 600 of FIG. 6. The access point and the low-power station may operate based on the EDCA scheme shown in FIG. 3.

When the low-power station operates in the WUR mode, the access point may transmit a WUR wake-up frame 801 to wake up the low-power station. For example, the access point may generate the WUR wake-up frame 801, and may transmit the WUR wake-up frame 801 to the low-power station when the channel state is determined to be idle in the carrier sensing period. In the following embodiments, the carrier sensing period may be SIFS, PIFS, DIFS, AIFS, (DIFS+backoff period), (AIFS [AC_VO]+backoff period [AC_VO]), (AIFS [AC_VI])+backoff period [AC_VI]), (AIFS [AC_BE])+backoff period [AC_BE]), or (AIFS [AC_BK])+backoff period [AC_BK]).

The WUR wake-up frame 801 may be configured as follows.

Figure 9:
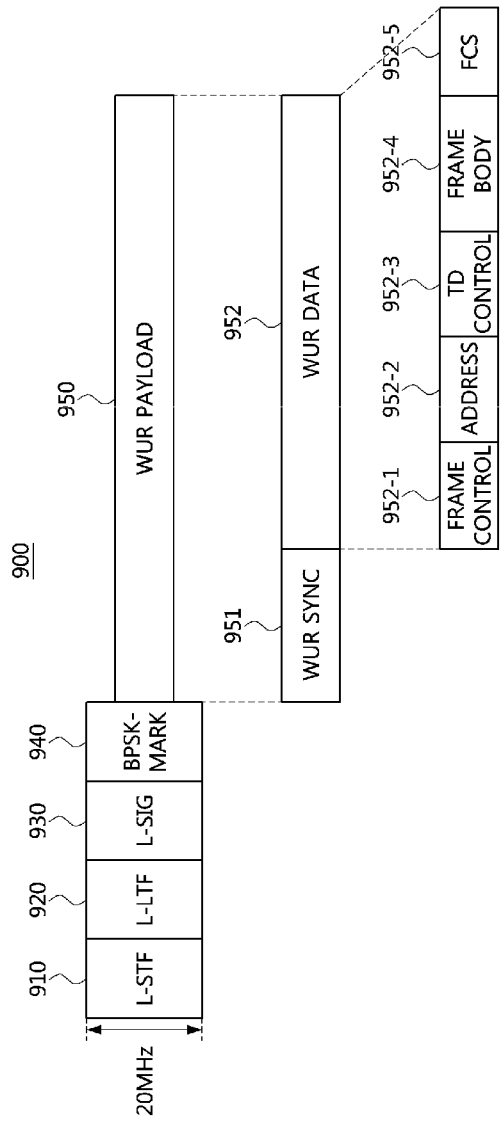
FIG. 9 is a block diagram illustrating a first embodiment of a WUR wake-up frame in a WLAN-based communication system.

FIG. 9 is a block diagram illustrating a first embodiment of a WUR wake-up frame in a WLAN-based communication system.

Referring to FIG. 9, a WUR wake-up frame 900 may include a legacy preamble and a WUR payload 950. The legacy preamble may include a legacy short training field (L-STF) 910, a legacy long training field (L-LTF) 920, and a legacy signal (L-SIG) field 930. The size of the frequency band to which the legacy preamble is mapped may be 20 MHz. Also, the legacy preamble may further include a binary phase shift keying (BPSK)-mark 940. The BPSK-mark 940 may be composed of one symbol (e.g., an orthogonal frequency division multiplexing (OFDM) symbol) modulated in a BPSK scheme.

The BPSK-mark 940 may be used to prevent a legacy station (e.g., station supporting IEEE 802.11n) from performing a channel state monitoring operation (e.g., carrier sensing operation, energy detection (ED) operation) for a signal after the legacy preamble according to a frame recognition error occurring when the WUR wake-up frame 900 is erroneously determined to be another IEEE 802.11 frame. When the legacy station performs the energy detection (ED) operation in a 20 MHz bandwidth according to the frame recognition error, since the transmission bandwidth of the WUR payload 950 is narrow and the received power detected by the ED operation is low, the legacy station may transmit a frame in the transmission-duration of the WUR payload 950. In order to avoid this problem, the BPSK-mark 940 may be used.

The WUR payload 950 may be modulated based on the OOK scheme. The size of the frequency band to which the WUR payload 950 is mapped may be smaller than 20 MHz. The WUR payload 950 may further include a WUR sync field 951 and a WUR data field 952. The WUR sync field 951 may include a pseudo random (PN) sequence used for synchronization between an access point and a low-power station (e.g., a WURx included in the low-power station). Also, the PN sequence may indicate a data rate and a bandwidth.

The WUR data field 952 may include a frame control field 952-1, an address field 952-2, a TD control field 952-3, a frame body 952-4, and a frame check sequence (FCS) field 952-5. The address field 952-2 may indicate an identifier (e.g., association identifier (AID)) of a low-power station to receive the WUR wake-up frame 900 or a group identifier of low-power stations. Each of the TD control field 952-3 and the frame body 952-4 may include information elements necessary for the low-power operation (e.g., the operation in accordance with the WUR mode).

Referring again to FIG. 8, the WUR wake-up frame 801 may be the same as or similar to the WUR wake-up frame 900 of FIG. 9. The access point may transmit the WUR wake-up frame 801. The WURx of the low-power station may receive the WUR wake-up frame 801, and may wake up a PCR when a wake-up target (e.g., a communication node indicated by the address field) indicated by the WUR wake-up frame 801 is the low-power station itself. That is, when the WUR wake-up frame 801 is received, the operation state of the PCR of the low-power station may transition from the sleep state to the wake-up state.

The PCR of the low-power station operating in the wake-up state may transmit a WUR-poll frame 802 to the access point. The WUR-poll frame 802 may be transmitted when the channel state is determined to be idle in the carrier sensing period. The WUR-poll frame 802 may indicate that the operation state of the PCR of the low-power station has transitioned from the sleep state to the wake-up state. Here, the WUR-poll frame 802 may be a power saving (PS)-poll frame, an unscheduled-automatic power saver delivery (U-APSD) frame, or an arbitrary frame (e.g., a null frame).

When the WUR-poll frame 802 is received from the low-power station, the access point may determine that the operation state of the PCR of the low-power station has transitioned from the sleep state to the wake-up state. The access point may transmit an ACK frame (not shown) to the low-power station in response to the WUR-poll frame 802. The ACK frame may be transmitted after an SIFS from the end point of the WUR-poll frame 802. Here, the transmission of the ACK frame, which is a response to the WUR-poll frame 802, may be omitted.

When it is determined that the PCR of the low-power station operates in the wake-up state, the access point may transmit a data frame 803 to the low-power station. The data frame 803 may be transmitted when the channel state is determined to be idle in the carrier sensing period. The low-power station may receive the data frame 803 from the access point, and may transmit an ACK frame 804 to the access point in response to the data frame 803 when the data frame 803 is successfully received. The ACK frame 804 may be transmitted after an SIFS from the end of the data frame 803. When the ACK frame 804 is received, the access point may determine that the data frame 803 is received at the low-power station.

Meanwhile, in order to further reduce the standby power in the low-power station, the WURx included in the low-power station may periodically transition from the wake-up state to the sleep state. A periodicity at which the WURx included in the low-power station transitions from the sleep state to the wake-up state, a time period for which the WURx included in the low-power station maintains the wake-up state, and the like may be configured in a negotiation procedure for a WUR operation (e.g., the WUR mode) between the access point and the low-power-station. Therefore, when there is data to be transmitted to the low-power station at the access point, the access point may transmit the WUR wake-up frame 801 to the low-power station taking into account the operation state of the WURx included in the low-power station.

Figure 10:
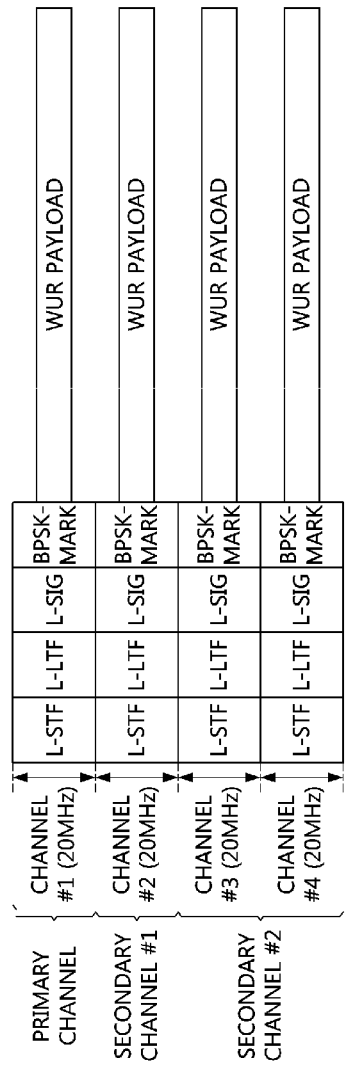
FIG. 10 is a block diagram illustrating a second embodiment of a WUR wake-up frame in a WLAN-based communication system.

FIG. 10 is a block diagram illustrating a second embodiment of a WUR wake-up frame in a WLAN-based communication system.

Referring to FIG. 10, a WUR wake-up frame may be transmitted in a frequency division multiple access (FDMA) scheme. Each of an L-STF, an L-LTF, an L-SIG field, a BPSK-mark, and a WUR payload which are shown in FIG. 10 may be the same as or similar to the L-STF 910, the L-LTF 920, the L-SIG field 930, the BPSK-mark 940, and the WUR payload 950 which are shown in FIG. 9. One WUR frame (e.g., WUR wake-up frame) may be transmitted through a 20 MHz band. Accordingly, the number of WUR frames that can be transmitted in the same time interval may be determined according to the size of the frequency band supported by the access point.

For example, when the size of the frequency band supported by the access point is 40 MHz, the access point may transmit 2 WUR wake-up frames to the low-power stations. Alternatively, when the size of the frequency band supported by the access point is 80 MHz, the access point may transmit 4 WUR wake-up frames to the low-power stations. In this case, the access point may transmit a WUR wake-up frame to a low-power station #1 using a channel #1, a WUR wake-up frame to a low-power station #2 using a channel #2, a WUR wake-up frame to a low-power station #3 using a channel #3, and a WUR wake-up frame to a low-power station #4 using a channel #4. The channel #1 may be a primary channel, and channels #2 to #4 may be at least one secondary channel. One secondary channel may be composed of one or more channels. For example, a secondary channel #1 may be composed of the channel #2, and a secondary channel #2 may be composed of the channels #3 and #4. At least one padding bit may be added to each of the WUR wake-up frames to equalize the length of WUR wake-up frames transmitted through the plurality of frequency bands.

The channel through which the WUR wake-up frame is transmitted may be configured in the negotiation procedure for the WUR operation between the access point and the low-power station. For example, in the negotiation procedure for the WUR operation between the access point and low-power station #1, the WUR wake-up frame for the low power-station #1 may be configured to be transmitted through the primary channel (e.g., channel #1). Therefore, the WURx included in the low-power station #1 may monitor the primary channel to receive the WUR wake-up frame. In the same manner, the secondary channel #1 (e.g., channel

2) used for transmitting the WUR wake-up frame for the low-power station #2 may be configured, the secondary channel #2 (e.g., channels #3 and #4) used for transmitting the WUR wake-up frame for the low-power station #3 may be configured, and the secondary channel #2 (e.g., channels #3 and #4) used for transmitting the WUR wake-up frame for the low-power station #4 may be configured.

On the other hand, when there is no data to be transmitted to the low-power stations using one or more of the channels #1 to #4 or when one or more of the channels #1 to 4 are not idle, the access point may transmit the WUR wake-up frames using channels other than the one or more channels among the channels #1 to #4. In this case, the WUR wake-up frames may not be transmitted continuously in the frequency axis.

Figure 11:
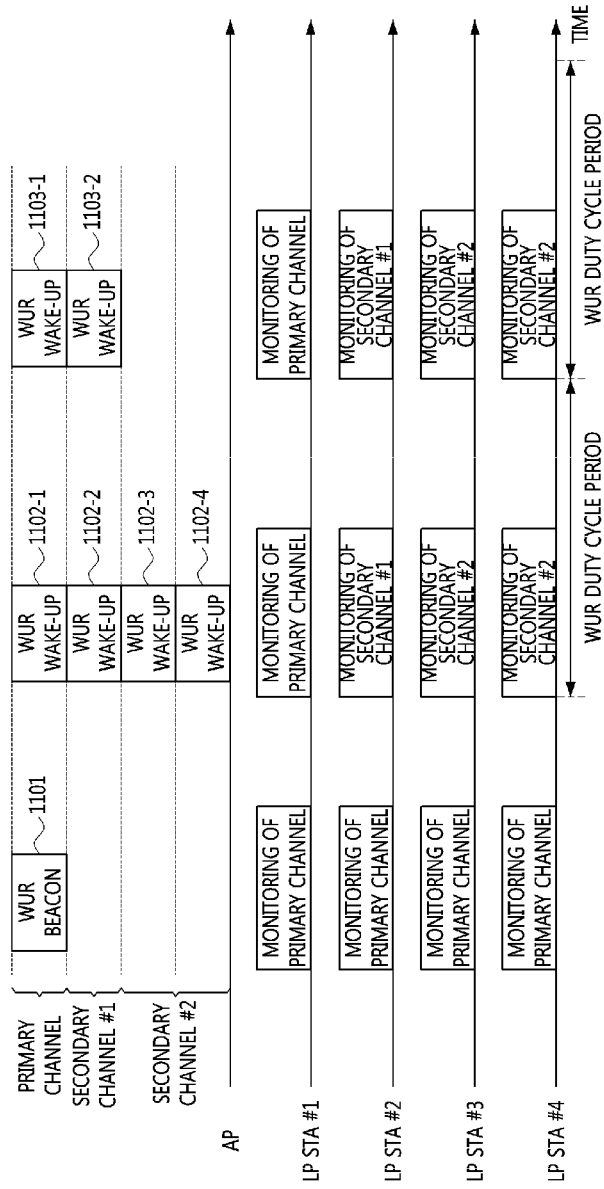
FIG. 11 is a timing diagram illustrating a second embodiment of an operation method of a communication node in a WLAN-based communication system.

FIG. 11 is a timing diagram illustrating a second embodiment of an operation method of a communication node in a WLAN-based communication system.

Referring to FIG. 11, a WLAN-based communication system may include an access point (AP), a low-power station #1 (LP STA #1), a low-power station #2 (LP STA #2), a low-power station #3 (LP STA #3), a low-power station #4 (LP STA #4), and the like. The low-power stations #1 to #4 may belong to the coverage of the access point, and may be connected to the access point. The access point and the low-power stations #1 to #4 may be configured to be the same as or similar to the low-power station 500 of FIG. 5. Also, the access point and low-power stations #1 to #4 may further include a WUTx as compared to the low-power station 500 of FIG. 5. Alternatively, the access point and low-power stations #1 to #4 may be configured to be the same as or similar to the low-power station 600 of FIG. 6. The access point and the low-power stations #1 to #4 may operate based on the EDCA scheme shown in FIG. 3.

Also, in the WLAN-based communication system, the primary channel may be set to the channel #1 shown in FIG. 10, the secondary channel #1 may be set to the channel #2 shown in FIG. 10, and the secondary channel #2 may be set to the channels #3 and #4 shown in FIG. 10. In the negotiation procedure for the WUR operation between the access point and the low-power station #1, an operating channel of the low-power station #1 may be set to the primary channel. In the negotiation procedure for the WUR operation between the access point and the low-power station #2, an operating channel of the low-power station #2 may be set to the secondary channel #1. In the negotiation procedure for the WUR operation between the access point and the low-power station #3, an operating channel of the low-power station #3 may be set to the secondary channel #2. In the negotiation procedure for the WUR operation between the access point and the low-power station #4, an operating channel of the low-power station #4 may be set to the secondary channel #2.

The access point may transmit a WUR beacon frame 1101 in the primary channel. The WUR beacon frame may include a MAC header, a frame body, and an FCS field. The frame body of the WUR beacon frame may include one or more of a WUR capability element, a WUR operation element, and a WUR discovery element. The low-power stations #1 to #4 may monitor the primary channel to receive the WUR beacon frame. The low-power stations #1 to #4 may receive the WUR beacon frame through the primary channel, and identify the information included in the WUR beacon frame. Since the operating channels of the low-power stations #2 to #4 are not the primary channel, the low-power stations #2 to #4 may change their operating channels from the secondary channel to the primary channel before receiving the WUR beacon frame. The negotiation procedure for the WUR operation between the access point and the low-power stations #1 to #4 may be performed when the WUR beacon frame is not transmitted. In addition, at a time in which the WUR beacon frame is not transmitted, the access point may transmit the WUR wake-up frames 1102-1 to 1102-4 to the low-power stations #1-4.

When there is data to be transmitted to the low-power stations #1 to #4 at the access point, the access point may transmit WUR wake-up frames 1102-1 to 1102-4 to the low-power stations #1 to #4. For example, the access point may transmit the WUR wake-up frame 1102-1 to the low-power station #1 using the primary channel when the primary channel is determined to be idle according to the EDCA scheme. When the WUR wake-up frame 1102-1 can be transmitted through the primary channel, if the secondary channels #1 and #2 are determined to be idle for "IFS according to the EDCA scheme+priority interframe space (PIFS)," "IFS according to the EDCA scheme," or "PIFS," the access point may transmit the WUR wake-up frames 1102-2 to 1102-4 to the low-power stations #2 to #4 using the secondary channels #1 and #2. The WUR wake-up frames 1102-2 to 1102-4 may be transmitted later than the WUR wake-up frame 1102-1 by a PIFS. Alternatively, the WUR wake-up frames 1102-1 to 1102-4 may be transmitted simultaneously.

The low-power station #1 (e.g., WURx included in the low-power station #1) may receive the WUR wake-up frame 1102-1 by monitoring the primary channel. In this case, the operation state of the PCR included in the low-power station #1 may transition from the sleep state to the wake-up state, and the low-power station #1 may receive a data frame from the access point. Here, the data frame may be received through the primary channel. Alternatively, the data frame may be received through another channel instead of the primary channel (i.e., the channel in which the WUR wake-up frame is received).

The low-power station #2 (e.g., WURx included in the low-power station #2) may receive the WUR wake-up frame 1102-2 by monitoring the secondary channel #1. In this case, the operation state of the PCR included in the low-power station #2 may transition from the sleep state to the wake-up state, and the low-power station #2 may receive a data frame from the access point. Here, the data frame may be received through the secondary channel #1. Alternatively, the data frame may be received through another channel instead of the secondary channel #1 (i.e., the channel in which the WUR wake-up frame is received).

The low-power station #3 (e.g., WURx included in the low-power station #3) may receive the WUR wake-up frame 1102-3 by monitoring the secondary channel #2. Here, the WUR wake-up frame 1102-3 may be received through the channel #3 (i.e., the channel #3 shown in FIG. 10) belonging to the secondary channel #2. In this case, the operation state of the PCR included in the low-power station #3 may transition from the sleep state to the wake-up state, and the low-power station #3 may receive a data frame from the access point. Here, the data frame may be received through the channel #3 belonging to the secondary channel #2. Alternatively, the data frame may be received through another channel instead of the channel #3 belonging to the secondary channel #2 (i.e., the channel in which the WUR wake-up frame is received).

The low-power station #4 (e.g., WURx included in the low-power station #4) may receive the WUR wake-up frame 1102-4 by monitoring the secondary channel #2. Here, the WUR wake-up frame 1102-4 may be received through the channel #4 (i.e., the channel #4 shown in FIG. 10) belonging to the secondary channel #2. In this case, the operation state of the PCR included in the low-power station #4 may transition from the sleep state to the wake-up state, and the low-power station #4 may receive a data frame from the access point. Here, the data frame may be received through the channel #4 belonging to the secondary channel #2. Alternatively, the data frame may be received through another channel instead of the channel #4 belonging to the secondary channel #2 (i.e., the channel in which the WUR wake-up frame is received).

On the other hand, the WUR wake-up frame may be transmitted using some frequency bands among the entire frequency bands. For example, when there is no data to be transmitted to the low-power stations #3 and #4 or when the secondary channel #2 is not idle, the access point may not transmit the WUR wake-up frames using the secondary channel #2. In this case, the access point may transmit the WUR wake-up frame 1103-1 to the low-power station #1 using the primary channel when the primary channel is determined to be idle according to the EDCA scheme. When the WUR wake-up frame 1103-1 can be transmitted through the primary channel, if the secondary channel #1 is determined to be idle for "IFS according to the EDCA scheme+PIFS," "IFS according to the EDCA scheme," or "PIFS," the access point may transmit the WUR wake-up frame 1103-2 to the low-power station #2 using the secondary channel #1. The WUR wake-up frame 1103-2 may be transmitted later than the WUR wake-up frame 1103-1 by a PIFS. Alternatively, the WUR wake-up frames 1103-1 and 1103-2 may be transmitted simultaneously.

The low-power station #1 (e.g., WURx included in the low-power station #1) may receive the WUR wake-up frame 1103-1 by monitoring the primary channel. In this case, the operation state of the PCR included in the low-power station #1 may transition from the sleep state to the wake-up state, and the low-power station #1 may receive a data frame from the access point. Here, the data frame may be received through the primary channel. Alternatively, the data frame may be received through another channel instead of the primary channel (i.e., the channel in which the WUR wake-up frame is received).

The low-power station #2 (e.g., WURx included in the low-power station #2) may receive the WUR wake-up frame 1103-2 by monitoring the secondary channel #1. In this case, the operation state of the PCR included in the low-power station #2 may transition from the sleep state to the wake-up state, and the low-power station #2 may receive a data frame from the access point. Here, the data frame may be received through the secondary channel #1. Alternatively, the data frame may be received through another channel instead of the secondary channel #1 (i.e., the channel in which the WUR wake-up frame is received).

The low-power stations #3 and #4 may not receive the WUR wake-up frame from the access point. Therefore, the PCR included in the low-power stations #3 and #4 may maintain the sleep state.

Figure 12:
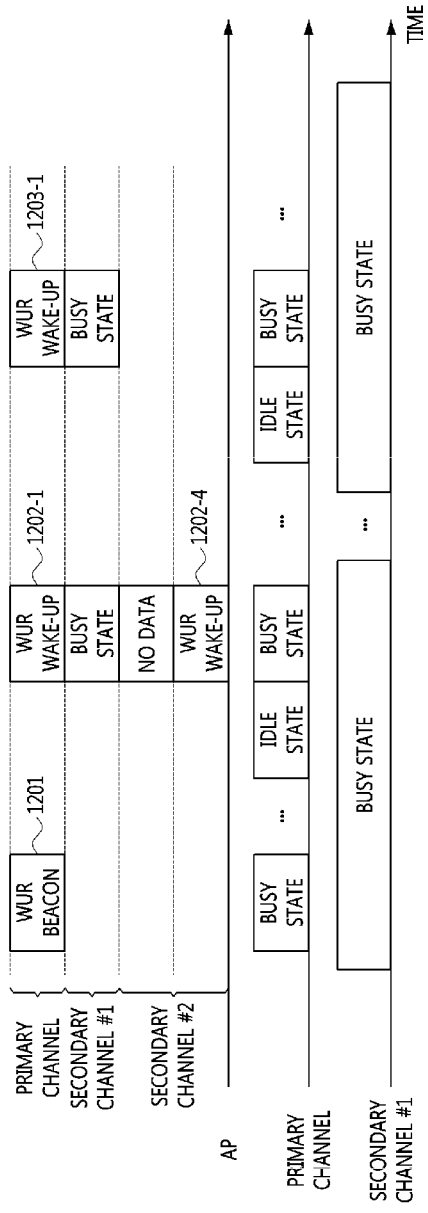
FIG. 12 is a timing diagram illustrating a third embodiment of an operation method of a communication node in a WLAN-based communication system.

FIG. 12 is a timing diagram illustrating a third embodiment of an operation method of a communication node in a WLAN-based communication system.

Referring to FIG. 12, a WLAN-based communication system may include an access point (AP), a low-power station #1 (LP STA #1), a low-power station #2 (LP STA #2), a low-power station #3 (LP STA #3), a low-power station #4 (LP STA #4), and the like. The low-power stations #1 to #4 may belong to the coverage of the access point, and may be connected to the access point. The access point and the low-power stations #1 to #4 may be configured to be the same as or similar to the low-power station 500 of FIG. 5. Also, the access point and low-power stations #1 to #4 may further include a WUTx as compared to the low-power station 500 of FIG. 5. Alternatively, the access point and low-power stations #1 to #4 may be configured to be the same as or similar to the low-power station 600 of FIG. 6. The access point and the low-power stations #1 to #4 may operate based on the EDCA scheme shown in FIG. 3.

Also, in the WLAN-based communication system, the primary channel may be set to the channel #1 shown in FIG. 10, the secondary channel #1 may be set to the channel #2 shown in FIG. 10, and the secondary channel #2 may be set to the channels #3 and #4 shown in FIG. 10. In the negotiation procedure for the WUR operation between the access point and the low-power station #1, the operating channel of the low-power station #1 may be set to the primary channel. In the negotiation procedure for the WUR operation between the access point and the low-power station #2, the operating channel of the low-power station #2 may be set to the secondary channel #1. In the negotiation procedure for the WUR operation between the access point and the low-power station #3, the operating channel of the low-power station #3 may be set to the secondary channel #2. In the negotiation procedure for the WUR operation between the access point and the low-power station #4, the operating channel of the low-power station #4 may be set to the secondary channel #2.

If a specific channel is busy at the time of transmission of the WUR wake-up frame, the access point may not be able to transmit the WUR wake-up frame. For example, when there is data to be transmitted to the low-power station #2 at the access point and the secondary channel #1 is busy at the time of transmission of the WUR wake-up frame, the access point may not be able to transmit the WUR wake-up frame to the low-power station #2 through the secondary channel #1. In this case, it may be necessary to change the operating channel of the low-power station #2 to another channel.

In order to change the operating channel of the low-power station #2, the negotiation procedure for the WUR operation between the access point and the low-power station #2 should be performed again. However, in order to perform the negotiate procedure, it is necessary to wake up the low-power station #2, but it may be difficult to transmit the WUR wake-up frame to the low-power station #2 when the secondary channel #1 is busy. That is, it may be difficult to change the operating channel of the low-power station #2.

In order to solve this problem, an alive cycle period and an alive timer may be configured in the WLAN-based communication system. The alive cycle period and the alive timer may be configured in the previous negotiation procedure for WUR operation between the access point and the low-power station. The alive cycle period may be composed of one or more WUR duty cycle periods. When the alive cycle period and the alive timer are configured, the communication node can operate as follows.

Figure 13:
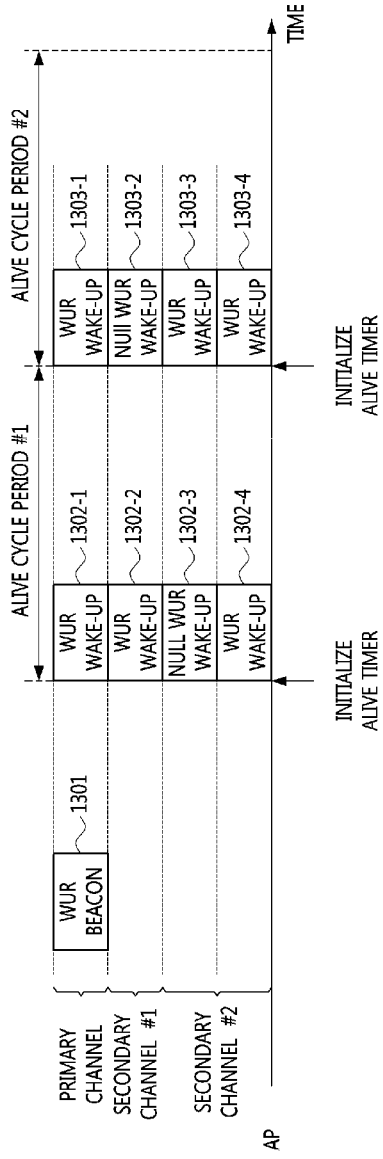
FIG. 13 is a timing diagram illustrating a fourth embodiment of an operation method of a communication node in a WLAN-based communication system.

FIG. 13 is a timing diagram illustrating a fourth embodiment of an operation method of a communication node in a WLAN-based communication system.

Referring to FIG. 13, a WLAN-based communication system may include an access point (AP), a low-power station #1 (LP STA #1), a low-power station #2 (LP STA #2), a low-power station #3 (LP STA #3), a low-power station #4 (LP STA #4), and the like. The low-power stations #1 to #4 may belong to the coverage of the access point, and may be connected to the access point. The access point and the low-power stations #1 to #4 may be configured to be the same as or similar to the low-power station 500 of FIG. 5. Also, the access point and low-power stations #1 to #4 may further include a WUTx as compared to the low-power station 500 of FIG. 5. Alternatively, the access point and low-power stations #1 to #4 may be configured to be the same as or similar to the low-power station 600 of FIG. 6. The access point and the low-power stations #1 to #4 may operate based on the EDCA scheme shown in FIG. 3.

Also, in the WLAN-based communication system, the primary channel may be set to the channel #1 shown in FIG. 10, the secondary channel #1 may be set to the channel #2 shown in FIG. 10, and the secondary channel #2 may be set to the channels #3 and #4 shown in FIG. 10. In the negotiation procedure for the WUR operation between the access point and the low-power station #1, the operating channel of the low-power station #1 may be set to the primary channel. In the negotiation procedure for the WUR operation between the access point and the low-power station #2, the operating channel of the low-power station #2 may be set to the secondary channel #1. In the negotiation procedure for the WUR operation between the access point and the low-power station #3, the operating channel of the low-power station #3 may be set to the secondary channel #2. In the negotiation procedure for the WUR operation between the access point and the low-power station #4, the operating channel of the low-power station #4 may be set to the secondary channel #2.

Even when there is no data to be transmitted to the low-power station, the access point may transmit a null WUR wake-up frame to the low-power station in the alive cycle period. For example, when there is no data to be transmitted to the low-power station #3 in an alive cycle period #1, the access point may transmit the null WUR wake-up frame to the low-power station #3. Also, when there is no data to be transmitted to the low-power station #2 in an alive cycle period #2, the access point may transmit a null WUR wake-up frame to the low-power station #2.

The null WUR wake-up frame may be configured as a simple WUR frame, and may include an identifier of the low-power station which is to receive the null WUR wake-up frame. Alternatively, the null WUR wake-up frame may include a specific address or a specific group address instead of the identifier of the low-power station.

The low-power station receiving the null WUR wake-up frame may determine that the corresponding channel is valid. That is, the low-power station may determine that the corresponding channel is effectively managed by the access point. Since the null WUR wake-up frame is not a WUR wake-up frame for waking up the low-power station, the PCR included in the low-power station receiving the null WUR wake-up frame may maintain the sleep state.

The alive timer may indicate a time for which the corresponding channel is valid, and the indicated time may be a time corresponding to one or more alive cycle periods. If a WUR wake-up frame or a null WUR wake-up frame is received from the access point before the expiration of the alive timer, the low-power station may determine that the corresponding channel is valid and initialize the alive timer. On the other hand, if a WUR wake-up frame or a null WUR wake-up frame is not received from the access point before the expiration of the alive timer, the low-power station may determine that the corresponding channel is invalid. In this case, the PCR included in the low-power station may transition from the sleep state to the wake-up state, and the low-power station may perform a procedure of changing the operating channel with the access point. For example, the low-power station may transmit to the access point a frame requesting a change of the operating channel. The procedure of changing the operating channel may be performed in the same or similar manner as the negotiation procedure for the WUR operation. When the change of the operating channel is completed, the WURx included in the low-power station may monitor the changed operating channel to receive a WUR wake-up frame.

On the other hand, the procedure of changing the operating channel may be triggered by the access point.

Figure 14:
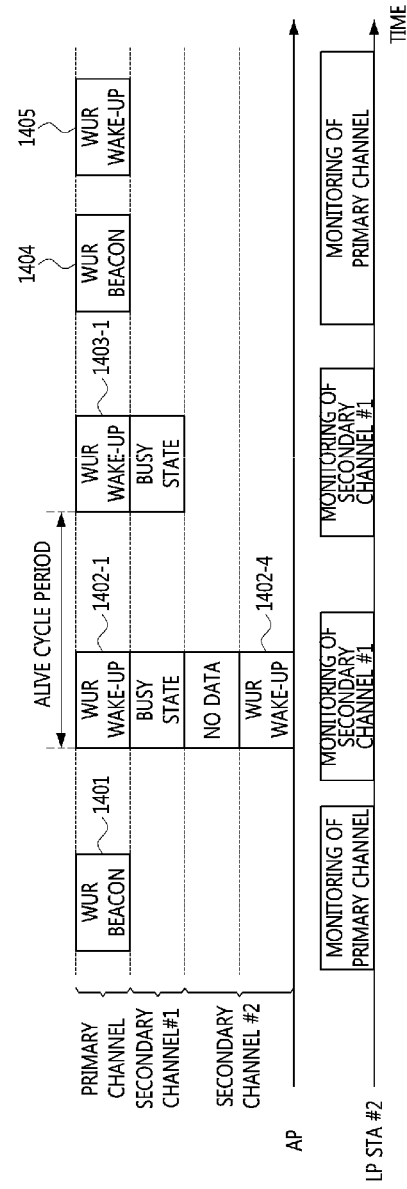
FIG. 14 is a timing diagram illustrating a fifth embodiment of an operation method of a communication node in a WLAN-based communication system.

FIG. 14 is a timing diagram illustrating a fifth embodiment of an operation method of a communication node in a WLAN-based communication system.

Referring to FIG. 14, a WLAN-based communication system may include an access point (AP), a low-power station #1 (LP STA #1), a low-power station #2 (LP STA #2), a low-power station #3 (LP STA #3), a low-power station #4 (LP STA #4), and the like. The low-power stations #1 to #4 may belong to the coverage of the access point, and may be connected to the access point. The access point and the low-power stations #1 to #4 may be configured to be the same as or similar to the low-power station 500 of FIG. 5. Also, the access point and low-power stations #1 to #4 may further include a WUTx as compared to the low-power station 500 of FIG. 5. Alternatively, the access point and low-power stations #1 to #4 may be configured to be the same as or similar to the low-power station 600 of FIG. 6. The access point and the low-power stations #1 to #4 may operate based on the EDCA scheme shown in FIG. 3.

Also, in the WLAN-based communication system, the primary channel may be set to the channel #1 shown in FIG. 10, the secondary channel #1 may be set to the channel #2 shown in FIG. 10, and the secondary channel #2 may be set to the channels #3 and #4 shown in FIG. 10. In the negotiation procedure for the WUR operation between the access point and the low-power station #1, the operating channel of the low-power station #1 may be set to the primary channel. In the negotiation procedure for the WUR operation between the access point and the low-power station #2, the operating channel of the low-power station #2 may be set to the secondary channel #1. In the negotiation procedure for the WUR operation between the access point and the low-power station #3, the operating channel of the low-power station #3 may be set to the secondary channel #2. In the negotiation procedure for the WUR operation between the access point and the low-power station #4, the operating channel of the low-power station #4 may be set to the secondary channel #2.

When there is data to be transmitted to the low-power station #2 at the access point and the secondary channel #1 is busy at the time of transmission of the WUR wake-up frame for the low-power station #2, the access point may not be able to transmit the WUR wake-up frame through the secondary channel #1. If the WUR wake-up frame cannot be transmitted to the low-power station #2 for a preconfigured time (e.g., the alive cycle period and the alive timer), the access point may determine that the operating channel of the low-power station #2 needs to be changed.

In this case, the access point may transmit a WUR wake-up frame 1405 in a broadcasting manner through the primary channel after transmission of a WUR beacon frame 1404. The WUR beacon frame 1404 may include an indicator indicating that the WUR wake-up frame 1405 is to be transmitted in succession to the WUR beacon frame 1404.

The destination of the WUR wake-up frame 1405 may be the low-power station #2, all the low-power stations, or low-power stations belonging to a specific group. For example, the destination address of the WUR wake-up frame 1405 may be set to the identifier of the low-power station #2, a broadcast identifier, a group identifier, or a plurality of identifiers of the low-power stations. The identifiers of the plurality of low-power stations may be included in the frame body of the WUR wake-up frame 1405.

The low-power stations #1 to #4 may receive the WUR beacon frame 1404 from the access point, and determine that the WUR wake-up frame 1405 is to be transmitted in succession to the WUR beacon frame 1404 by identifying the indicator included in the WUR beacon frame 1404. Accordingly, the WURx of the low-power stations #1 to #4 may maintain the wake-up state even after receiving the WUR beacon frame 1404, and can receive the WUR wake-up frame 1405 from the access point.

When the destination address of the WUR wake-up frame 1405 indicates the low-power station #2, the PCR included in the low-power station #2 may transition from the sleep state to the wake-up state, and perform the procedure of changing the operating channel with the access point. For example, in the procedure of changing the operating channel, the access point may transmit to the low-power station #2 a change request frame including information indicating a changed operating channel. The low-power station #2 may receive the change request frame from the access point, identify the operating channel indicated by the change request frame, and transmit an ACK frame for the change request frame to the access point. Accordingly, the WURx included in the low-power station #2 may perform a monitoring operation on the operating channel indicated by the change request frame.

Alternatively, when the destination address of the WUR wake-up frame 1405 is set to the broadcasting identifier, the PCRs included in the low-power stations #1 to #4 may transition from the sleep state to the wake-up state, and perform the procedure of changing the operating channel with the access point. That is, the access point may reconfigure the operating channels of all the low-power stations #1 to #4. Therefore, in the procedure of changing the operating channel, the access point may transmit a change request frame including information indicating a changed operating channel to each of the low-power stations #1 to #4. Each of the low-power stations #1 to #4 may receive the change request frame from the access point, identify the operating channel indicated by the change request frame, and transmit an ACK frame for the change request frame to the access point. Accordingly, the WURx included in each of the low-power stations #1 to #4 may perform a monitoring operation on the operating channel indicated by the change request frame.

Meanwhile, the low-power station includes the WURx and the PCR, and the PCR included in the low-power station may operate in the sleep state. When the PCR operates in the sleep state, the function of the PCR may be stopped. The PCR may transition from the sleep state to the wake-up state according to a signal received from the WURx (or, processor). Also, the WURx included in the low-power station may operate in the wake-up state or the sleep state. For example, the WURx may operate in the wake-up state in an on-duration within a WUR duty cycle period, and may operate in the sleep state in a time duration excluding the on-duration in the WUR duty cycle period. For the low-power communication, the low-power station may use a power save multi poll (PSMP) scheme. In this case, the communication node (e.g., the access point and the low-power station) may operate as follows.

Figure 15:
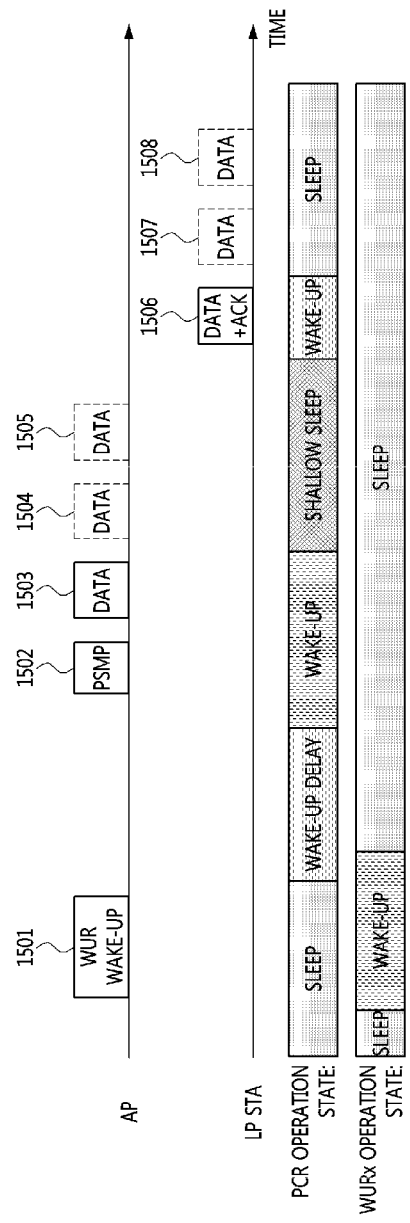
FIG. 15 is a timing diagram illustrating a sixth embodiment of an operation method of a communication node in a WLAN-based communication system.

FIG. 15 is a timing diagram illustrating a sixth embodiment of an operation method of a communication node in a WLAN-based communication system.

Referring to FIG. 15, a WLAN-based communication system may include an access point (AP), a low-power station (LP STA), and the like. The low-power station may belong to the coverage of the access point, and may be connected to the access point. The access point and the low-power station may be configured to be the same as or similar to the low-power station 500 of FIG. 5. Also, the access point and low-power station may further include a WUTx as compared to the low-power station 500 of FIG. 5. Alternatively, the access point and low-power station may be configured to be the same as or similar to the low-power station 600 of FIG. 6. The access point and the low-power station may operate based on the EDCA scheme shown in FIG. 3.

The access point may transmit a WUR wake-up frame 1501. The WURx included in the low-power station may operate in the wake-up state prior to the reception time of the WUR wake-up frame 1501, and may receive the WUR wake-up frame 1501 from the access point. When the WUR wake-up frame 1501 is received, the WURx (or, processor) included in the low-power station may wake up the PCR. The PCR may transition from the sleep state to the wake-up state after a wake-up delay time (e.g., state transition time).

The access point may know the wake-up delay time of the PCR included in the low-power station, and may transmit a PSMP frame 1502 to the low-power station after the wake-up delay time. The PSMP frame 1502 may be interpreted by a plurality of low-power stations, and may include information on a time allocated for the plurality of low-power stations within a PSMP service period. The plurality of low-power stations may transmit and receive frames at the time indicated by PSMP frame 1502. Also, the plurality of low-power stations may perform a power saving operation in the PSMP service period.

Meanwhile, a target wake time (TWT) may be configured between the access point and the low-power station. In this case, the PCR included in the low-power station may transition from the sleep state to the wake-up state at the TWT, and may maintain the wake-up state for a preconfigured time (e.g., a TWT service period (SP)) from the TWT. The preconfigured time may be preconfigured in the negotiation procedure between the access point and the low-power station. When the TWT is configured in the WLAN-based communication system, the communication node (e.g., the access point and the low-power station) may operate as follows.

Figure 16:
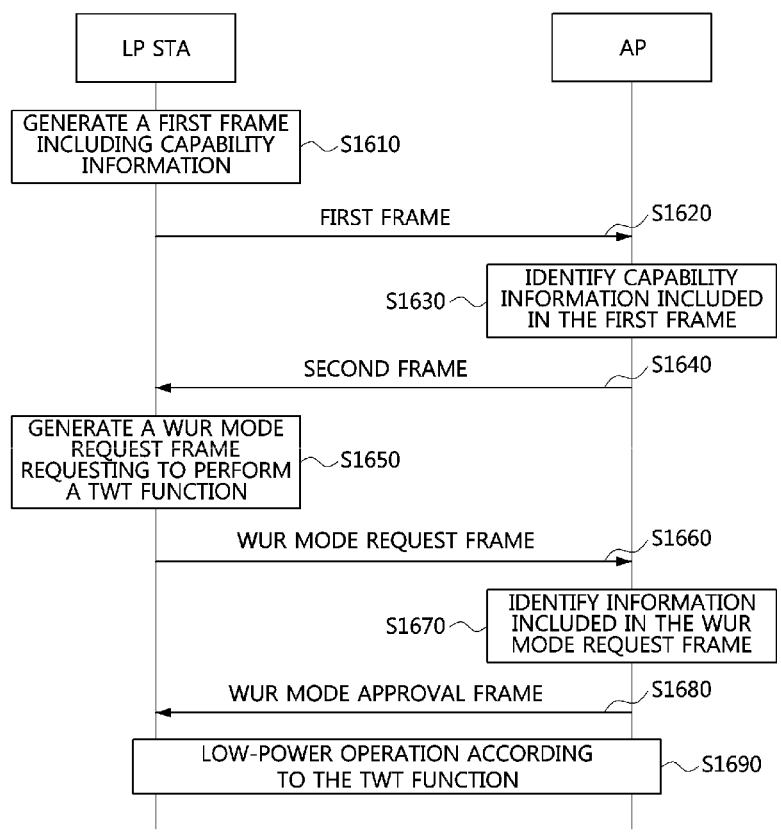
FIG. 16 is a timing diagram illustrating a seventh embodiment of an operation method of a communication node in a WLAN-based communication system.

FIG. 16 is a timing diagram illustrating a seventh embodiment of an operation method of a communication node in a WLAN-based communication system.

Referring to FIG. 16, a WLAN-based communication system may include an access point (AP), a low-power station (LP STA), and the like. The low-power station may belong to the coverage of the access point, and may be connected to the access point. The access point and the low-power station may be configured to be the same as or similar to the low-power station 500 of FIG. 5. Also, the access point and low-power station may further include a WUTx as compared to the low-power station 500 of FIG. 5. Alternatively, the access point and low-power station may be configured to be the same as or similar to the low-power station 600 of FIG. 6. The access point and the low-power station may operate based on the EDCA scheme shown in FIG. 3.

The low-power station may generate a first frame that includes WUR capability information (S1610). The first frame may be configured as follows.

Figure 17:
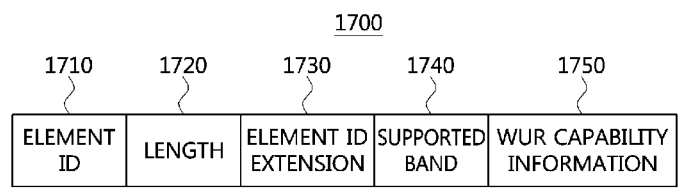
FIG. 17 is a block diagram illustrating a first frame in a WLAN-based communication system.

FIG. 17 is a block diagram illustrating a first frame in a WLAN-based communication system.

Referring to FIG. 17, a first frame 1700 may include an element ID field 1710, a length field 1720, an element ID extension field 1730, a supported band field 1740, and a WUR capability information field 1750. The WUR capability information field 1750 may include a first indicator indicating whether or not the TWT function is supported. The size of the first indicator may be 1 bit. For example, the first indicator set to '0' may indicate that the low-power station does not support the TWT function. The first indicator set to '1' may indicate that the low-power station supports the TWT function.

Referring again to FIG. 16, the low-power station may transmit the first frame to the access point (S1620). The first indicator included in the WUR capability information field of the first frame may indicate that the low-power station supports the TWT function. The access point may receive the first frame from the low-power station and may identify the information (e.g., WUR capability information) included in the first frame (S1630). For example, the access point may confirm that the low-power station supports the TWT function based on the information included in the first frame.

The access point may transmit to the low-power station a second frame indicating that the information included in the first frame has been confirmed (S1640). The second frame may be an ACK frame for the first frame. Further, the second frame may include information indicating the TWT and information indicating the TWT SP. Alternatively, when it is identified that the low-power station supports the TWT function, the access point may perform a separate procedure with the low-power station to negotiate the TWT. Alternatively, "when the information indicating the TWT and the information indicating the TWT SP are included in a WUR mode approval frame" or "when the separate procedure for negotiating the TWT is performed," the information indicating the TWT and the information indicating the TWT SP may not be included in the second frame.

The low-power station may receive the second frame from the access point. When the second frame is received, the low-power station may determine that the information included in the first frame has been confirmed by the access point. Further, the low-power station may identify the TWT and TWT SP indicated by the second frame. Accordingly, the PCR included in the low-power station may transition from the sleep state to the wake-up state at the TWT, and may maintain the wake-up state for the TWT SP.

Thereafter, the negotiation procedure for the WUR operation between the access point and the low-power station may be performed. In the negotiation procedure for the WUR operation, the low-power station may generate a WUR mode request frame including a second indicator requesting to perform the TWT operation (S1650). The WUR mode request frame may be configured as follows.

FIG. 18 is a block diagram illustrating a first embodiment of a WUR mode request frame in a WLAN-based communication system.

Referring to FIG. 18, a WUR mode request frame 1800 may include an element ID field 1810, a length field 1820, an element ID extension field 1830, a minimum wake-up duration field 1840, a duty cycle period unit field 1850, a WUR channel field 1860, a WUR beacon period 1870, a target WUR beacon transmission time (TWBTT) offset field 1880, and a WUR parameter field 1890. The WUR parameter field 1890 may include a second indicator indicating whether to perform the TWT operation. The size of the second indicator may be 1 bit. For example, the second indicator set to '0' may instruct to stop performing the TWT operation. The second indicator set to '1' may request to perform the TWT operation.

Referring again to FIG. 16, the low-power station may transmit a WUR mode request frame to the access point (S1660). The second indicator included in the WUR parameter field of the WUR mode request frame may request to perform the TWT operation. The access point may receive the WUR mode request frame from the-low-power station, and may identify the information (e.g., WUR parameter) included in the WUR mode request frame (S1670). For example, the access point may confirm that the execution of the TWT operation is requested based on the information included in the WUR mode request frame.

When the operation (e.g., TWT operation) requested by the WUR mode request frame is approved, the access point may transmit a WUR mode approval frame to the low-power station (S1680). The WUR mode approval frame may include information indicating the TWT and information indicating the TWT SP. Alternatively, when the information indicating the TWT and the information indicating the TWT SP are included in the second frame described above, the information indicating the TWT and the information indicating the TWT SP may not be included in the WUR mode approval frame.

The low-power station may receive the WUR mode approval frame from the access point. When the WUR mode approval frame is received, the low-power station may determine that the operation (e.g., TWT operation) requested by the WUR mode request frame is approved by the access point. Also, the low-power station may identify the TWT and TWT SP indicated by the WUR mode approval frame. Accordingly, the PCR included in the low-power station may transition from the sleep state to the wake-up state at the TWT, and may maintain the wake-up state for the TWT SP.

Meanwhile, the steps S1610 to S1640 may be performed to request execution of the TWT operation. In this case, the steps S1650 to S1680 may be omitted. Thus, when the second frame is received from the access point, the low-power station may determine that the TWT operation is to be performed. Alternatively, the steps S1650 to S1680 may be performed to request execution of the TWT operation. In this case, the steps S1610 to S1640 may be omitted. That is, the steps S1650 to S1680 may be performed without a procedure for notifying information indicating whether or not the TWT function is supported. Therefore, the low-power station supporting the TWT function may transmit the WUR mode request frame requesting the execution of the TWT operation to the access point. On the other hand, the low-power station that does not support the TWT function may not be able to transmit the WUR mode request frame requesting the execution of the TWT operation to the access point.

When the execution of the TWT operation is approved, the low-power communication operation according to the TWT function may be performed between the access point and the low-power station (S1690). The low-power communication operation according to the TWT function may be performed as follows. In a scheme #1, the WUR wake-up frame may be used, and in a scheme #2, the WUR wake-up frame may not be used.

Scheme #1

FIG. 19 is a timing chart illustrating a first embodiment of a low-power communication operation according to a TWT function in a WLAN-based communication system.

Referring to FIG. 19, the WURx of the low-power station may operate in the wake-up state for the on-duration within the WUR duty cycle period, and may operate in the sleep state for a time other than the on-duration within the WUR duty cycle period. The access point may transmit a WUR wake-up frame 1901 in the on-duration within the WUR duty cycle period. The WUR wake-up frame 1901 may be transmitted considering a wake-up delay time of the PCR of the low-power station. For example, the access point may transmit the WUR wake-up frame 1901 earlier than the TWT preconfigured between the access point and the low-power station at least by a wake-up delay time. The wake-up delay time may be a time required for the PCR of the low-power station to transition from the sleep state to the wake-up state.

The WURx of the low-power station may receive the WUR wake-up frame 1901 from the access point. When the WUR wake-up frame 1901 is received from the access point, the PCR of the low-power station may be woken up. For example, the processor (or, WURx) of the low-power station may transmit a wake-up interrupt signal to the PCR of the low-power station. When the wake-up interrupt signal is received from the processor of the low-power station (or, WURx), the PCR of the low-power station may transition from the sleep state to the wake-up state at the TWT, and may maintain the wake-up state for the TWT SP.

The access point may transmit to the-low-power station a trigger frame 1902 that triggers uplink transmission after the TWT. Alternatively, the transmission of the trigger frame 1902 may be skipped. The trigger frame 1902 may include an identifier of the low-power station, information indicating resources used for the uplink transmission, and the like. Further, the trigger frame 1902 may include information indicating the TWT SP. When there is a large amount of data to be transmitted to the low-power station, the TWT SP may be configured to be relatively long. On the other hand, when the amount of data to be transmitted to the low-power station is small, the TWT SP may be configured to be relatively short.

Meanwhile, when the amount of data to be transmitted to the low-power station is large, an ending time point of the TWT SP may be later than an ending time point of the corresponding WUR duty cycle period. In this case, the trigger frame 1902 may include information indicating that the on-duration of the next WUR duty cycle period continuous with the current WUR duty cycle period (e.g., the WUR duty cycle period in which the trigger fame 1902 is received) is not used. In this case, the WURx included in the low-power station may maintain the sleep state in the on-duration of the next WUR duty cycle period.

The PCR of the low-power station may receive the trigger frame 1902 from the access point, and may operate based on the information included in the trigger frame 1902. For example, the PCR of the low-power station may transmit an uplink frame 1903 to the access point. The access point may receive the uplink frame 1903 from the PCR of the low-power station. Also, the access point may transmit a downlink frame 1904 to the PCR of the low-power station. The PCR of the low-power station may receive the downlink frame 1904 from the access point. When the downlink frame 1904 is successfully received, the PCR of the low-power station may transmit an ACK frame 1905 to the access point. When the ACK frame 1905 is received from the PCR of the low-power station, the access point may determine that the downlink frame 1904 has been successfully received at the PCR of the low-power station. Here, the PCR of the low-power station may maintain the wake-up state for the TWT SP indicated by the second frame, the WUR mode approval frame, or the trigger frame 1902.

Scheme #2

Figure 20:
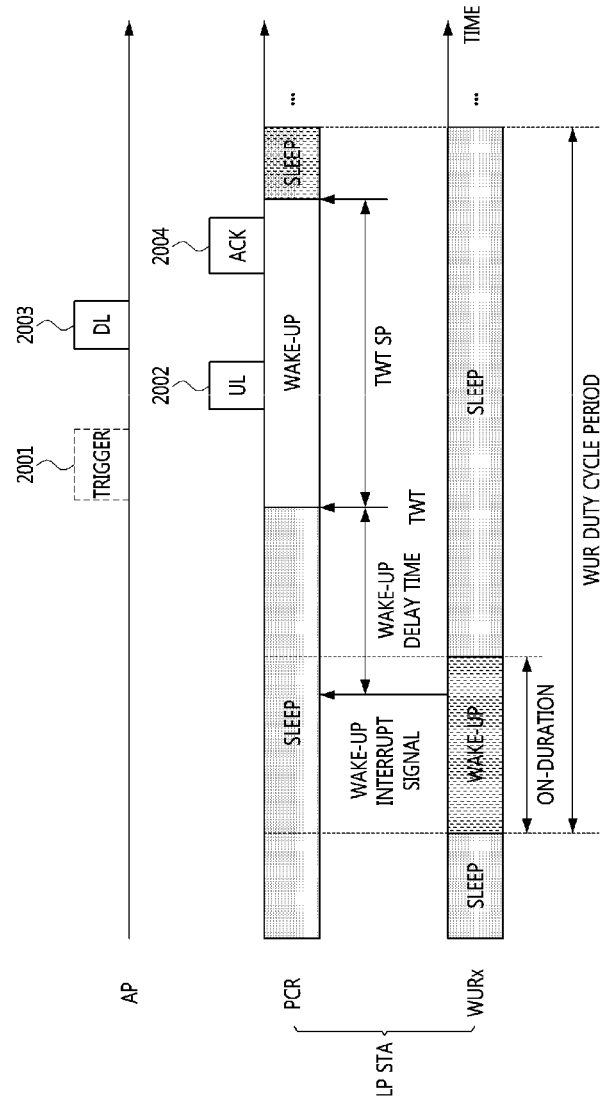
FIG. 20 is a timing chart illustrating a second embodiment of a low-power communication operation according to a TWT function in a WLAN-based communication system.

FIG. 20 is a timing chart illustrating a second embodiment of a low-power communication operation according to a TWT function in a WLAN-based communication system.

Referring to FIG. 20, the WURx of the low-power station may operate in the wake-up state for the on-duration within the WUR duty cycle period, and may operate in the sleep state for a time other than the on-duration in the WUR duty cycle period. Alternatively, if the TWT is preconfigured between the access point and the low-power station, the WURx of the low-power station may operate in the sleep state in the on-duration within the WUR duty cycle period. In this case, the WUR wake-up frame may not be transmitted from the access point in the on-duration.

Meanwhile, the processor (or, WURx) of the low-power station may transmit a wake-up interrupt signal to the PCR of the low-power station, taking into account a wake-up delay time of the PCR. The wake-up interrupt signal may be transmitted earlier than the TWT at least by a wake-up delay time. When the wake-up interrupt signal is received from the processor (or, WURx) of the low-power station, the PCR of the low-power station may transition from the sleep state to the wake-up state at the TWT, and may maintain the wake-up state for the TWT SP.

The access point may transmit to the-low-power station a trigger frame 2001 that triggers uplink transmission after the TWT. Alternatively, the transmission of the trigger frame 2001 may be omitted. The trigger frame 2001 may include an identifier of the low-power station, information indicating resources used for the uplink transmission, and the like. Further, the trigger frame 2001 may include information indicating the TWT SP. When there is a large amount of data to be transmitted to the low-power station, the TWT SP may be configured to be relatively long. On the other hand, when the amount of data to be transmitted to the low-power station is small, the TWT SP may be configured to be relatively short.

Meanwhile, when the amount of data to be transmitted to the low-power station is large, an ending time point of the TWT SP may be later than an ending time point of the corresponding WUR duty cycle period. In this case, the trigger frame 2001 may include information indicating that the on-duration of the next WUR duty cycle period continuous with the current WUR duty cycle period (e.g., the WUR duty cycle period in which the trigger fame 1902 is received) is not used. Accordingly, the WURx included in the low-power station may maintain the sleep state in the on-duration of the next WUR duty cycle period.

The PCR of the low-power station may receive the trigger frame 2001 from the access point, and may operate based on the information included in the trigger frame 2001. For example, the PCR of the low-power station may transmit an uplink frame 2002 to the access point. The access point may receive the uplink frame 2002 from the PCR of the low-power station. Also, the access point may transmit a downlink frame 2003 to the PCR of the low-power station. The PCR of the low-power station may receive the downlink frame 2003 from the access point. When the downlink frame 2003 is successfully received, the PCR of the low-power station may transmit an ACK frame 2004 to the access point. When the ACK frame 2004 is received from the PCR of the low-power station, the access point may determine that the downlink frame 2003 has been successfully received at the PCR of the low-power station. Here, the PCR of the low-power station may maintain the wake-up state for the TWT SP indicated by the second frame, the WUR mode approval frame, or the trigger frame 2001.

WUR Wake-Up for Multi-User Transmission

Meanwhile, for multi-user transmission, the access point may wake up multiple low-power stations by transmitting the WUR wake-up frame 900 shown in FIG. 9 multiple times. In this case, the performance of the communication system may be degraded due to the transmission of the plurality of WUR wake-up frames 900. In the following description, the WUR wake-up frame (hereinafter referred to as a 'multi-user (MU) WUR wake-up frame') for waking up a plurality of low-power stations will be described below.

Figure 21:
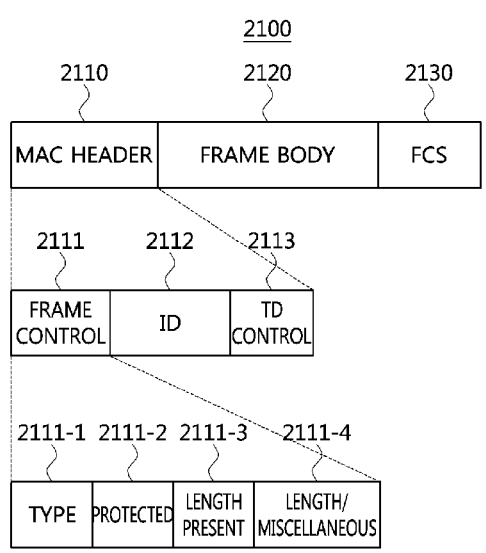
FIG. 21 is a block diagram illustrating a first embodiment of a WUR frame in a WLAN-based communication system.

FIG. 21 is a block diagram illustrating a first embodiment of a WUR frame in a WLAN-based communication system.

Referring to FIG. 21, a WUR frame 2100 may include a preamble (not shown) and a MAC frame. The MAC frame of the WUR frame 2100 may include a MAC header 2110, a frame body 2120, and an FCS field 2130. The MAC frame may include information necessary for operation (e.g., information of the low-power station, use of the WUR frame 2100, etc.). The MAC header 2110 may include a frame control field 2111, an ID field 2112, and a type dependent (TD) control field 2113. Here, the ID field 2112 may be referred to as an address field. The frame control field 2111 may include a type field 2111-1, a protected field 2111-2, a length present field 2111-3, and a length/miscellaneous field 2111-4.

The type field 2111-1 may indicate the type of the WUR frame 2100. The type of WUR frame 2100 may be a WUR beacon frame, a WUR wake-up frame, a WUR vendor specific frame, a WUR discovery frame, or a WUR short wake-up frame. For example, the WUR frame 2100 including the type field 2111-1 set to '001' may be the WUR wake-up frame. When the WUR frame 2100 includes the frame body 2120, the length of the frame body 2120 may be indicated by the length present field 2111-3 and the length/miscellaneous field 2111-4. The length present field 2111-3 may indicate whether the length/miscellaneous field 2111-4 indicates the length of the frame body 2120.

When the length/miscellaneous field 2111-4 is set to L, the length of the frame body 2120 may be 2(L+1) bytes or 16(L+1) bits. Accordingly, the frame body 2120 may be configured in 2-byte units. The information included in the frame body 2120 may vary depending on the type of the WUR frame 2100.

Meanwhile, the MU WUR wake-up frame may be used to wake up a plurality of low-power stations. In this case, the MU WUR wake-up frame may be generated based on Table 3 below. In Table 3, the items indicated as '–' may be set to a specific value according to the IEEE 802.11ba standard.

TABLE 3

| MAC header | | | | | | | |
|---|---|---|---|---|---|---|---|
| Frame control | | | | | | | |
| Type | Protected | Length present | Length/ miscellaneous | ID | TD control | Frame body | FCS |
| — | — | 0 | Number of STAs | 0 | — | IDs of LP STAs | — |

The ID field included in the MU WUR wake-up field may be set to 0. Also, the length present field included in the MU WUR wake-up frame may be set to 0, in which case the length/miscellaneous field included in the MU WUR wake-up frame may indicate the number of LP STAs to be woken up, and the frame body of the MU WUR wake-up frame may include the ID of each of the LP STAs to be woken up.

Thus, when an MU WUR wake-up frame is received that includes an ID field set to 0, the low-power station may determine that the MU WUR wake-up frame is used to wake up a plurality of low-power stations. The low-power station may identify the number of IDs (or, the length of the frame body) included in the frame body based on the values indicated by the length present field and the length/miscellaneous field included in the MU WUR wake-up frame. When the ID of the low-power station is equal to the ID included in the frame body of the WUR wake-up frame, the PCR included in the low-power station may transition from the sleep state to the wake-up state.

On the other hand, some low-power stations may not support a decoding function of the MU WUR wake-up frame. Accordingly, the MU WUR wake-up frame may be transmitted to low-power stations that support the decoding function of the MU WUR wake-up frame. Thus, prior to the transmission procedure of the MU WUR wake-up frame, a procedure for exchanging functions (e.g., the decoding function of the MU WUR wake-up frame) supported by the low-power stations may be performed.

For example, the functions supported by the low-power station may be exchanged through the connection procedure between the access point and the low-power station (e.g., transmission and reception procedures of a probe request frame and a probe response frame, transmission and reception procedures of an association request frame and an association response frame, etc.). Alternatively, the functions supported by the low-power station may be exchanged through the negotiation procedure for the WUR operation (e.g., WUR mode) between the access point and the low-power station. In this case, the WUR capability information field included in the WUR capability element may be used as follows.

Figure 22:
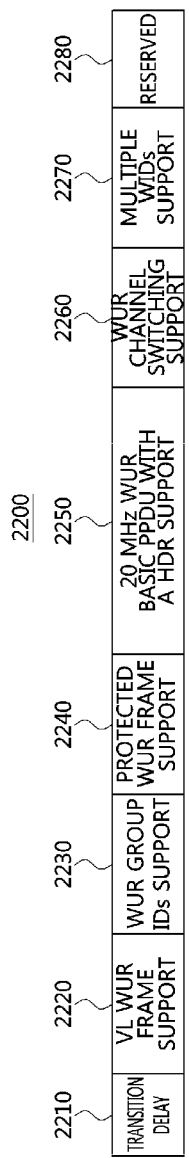
FIG. 22 is a block diagram illustrating a first embodiment of a WUR capability information field in a WLAN-based communication system.

FIG. 22 is a block diagram illustrating a first embodiment of a WUR capability information field in a WLAN-based communication system.

Referring to FIG. 22, a WUR capability information field 2200 may include a transition delay field 2210, a variable length (VL) WUR frame support field 2220, a WUR group IDs support field 2230, a protected WUR frame support field 2240, a 20 MHz WUR basic PPDU field 2250 with a high data rate (HDR) support, a WUR channel switching support field 2260, a multiple WIDs support field 2270, and a reserved field 2280. Alternatively, the WUR capability information field 2200 may include a WUR FDMA support field or a WUR short wake-up frame support field instead of the WUR channel switching support field 2260.

The multiple WIDs support field 2270 may be used to indicate whether or not the low-power station supports a decoding function of the MU WUR wake-up frame. The multiple WIDs support field 2270 set to '0' may indicate that the low-power station does not support the decoding function of the MU WUR wake-up frame. The multiple WIDs support field 2270 set to '1' may indicate that the low-power station supports the decoding function of the MU WUR wake-up frame. In this case, the VL WUR frame support field 2220 may be set to '1'.

On the other hand, the length field of the MU WUR wake-up frame may be set to 0. Even in this case, the MU WUR wake-up frame may include a frame body. When the length field of the MU WUR wake-up frame is set to 0, the length/miscellaneous field may indicate the number of low-power stations that are wake-up targets. For example, the length/miscellaneous field of the MU WUR wake-up frame may be set to (the number of low-power stations that are wake-up targets—1). In this case, the maximum number of low-power stations woken up by the MU WUR wake-up frame may be 8. Alternatively, the length/miscellaneous field of the MU WUR wake-up frame may be set to (the number of low-power stations that are wake-up targets—2). In this case, the maximum number of low-power stations woken up by the MU WUR wake-up frame may be 9.

When the length/miscellaneous field of the MU WUR wake-up frame indicates (the number of low-power stations that are wake-up targets—1) and the number of low-power stations that are wake-up targets is 1, the length/miscellaneous field may be set to 0. In this case, the ID field of the MU WUR wake-up frame may be set to the ID of the low-power station to be woken up, and the MU WUR wake-up frame may not include a frame body.

When the length/miscellaneous field of the MU WUR wake-up frame indicates (the number of low-power stations that are wake-up targets—1) and the number of low-power stations that are wake-up targets is greater than or equal to 2, the ID of each of the low-power stations to be woken up may be included in the frame body.

When the length/miscellaneous field of the MU WUR wake-up frame indicates (the number of low-power stations that are wake-up targets—2) and the length/miscellaneous field is set to 0, the number of low-power stations to be woken up (e.g., 1 or 2) may be unclear. In this case, when the ID field of the MU WUR wake-up frame is set to 0, the-low-power station may interpret that the frame body of the MU WUR wake-up frame includes the ID of each of the two low-power stations.

Meanwhile, the length of the frame body of the MU WUR wake-up frame may be proportional to the number of low-power stations that are wake-up targets. The frame body of the MU WUR wake-up frame may be configured as follows.

Figure 23:
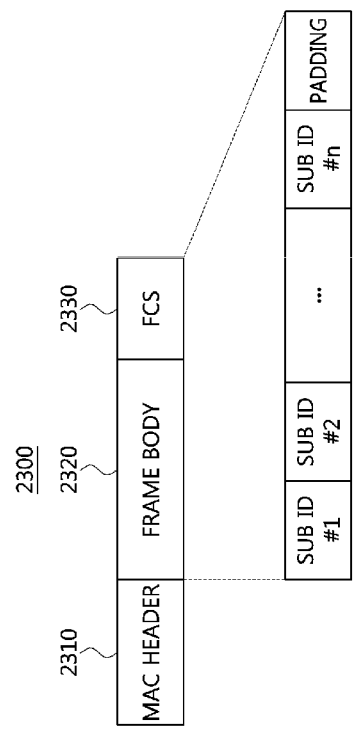
FIG. 23 is a block diagram illustrating a first embodiment of an MU WUR wake-up frame in a WLAN-based communication system.

FIG. 23 is a block diagram illustrating a first embodiment of a MU WUR wake-up frame in a WLAN-based communication system.

Referring to FIG. 23, a MU WUR wake-up frame 2300 may include a preamble (not shown), a MAC header 2310, a frame body 2320, and an FCS field 2330. The frame body 2320 may include one or more sub ID fields. Also, the frame body 2320 may further include padding bits as needed. One sub ID field may indicate an ID of one low-power station. The size of one sub ID field may be 12 bits.

Meanwhile, the padding bits of the frame body may be configured according to the number of low-power stations that are wake-up targets. For example, the size of the frame body and the size of the padding bits may be determined based on Table 4 below.

TABLE 4

| Number of LP STAs | Size of sub ID field (bits) | Size of frame body (bits) | Padding size (bits) |
|---|---|---|---|
| 1 | 12 | 16 | 4 |
| 2 | 24 | 32 | 8 |
| 3 | 36 | 48 | 12 |
| 4 | 48 | 48 | 0 |
| 5 | 60 | 64 | 4 |
| 6 | 72 | 80 | 8 |

TABLE 4-continued

| Number of LP STAs | Size of sub ID field (bits) | Size of frame body (bits) | Padding size (bits) |
|---|---|---|---|
| 7 | 84 | 96 | 12 |
| 8 | 96 | 96 | 0 |
| 9 | 108 | 112 | 4 |
| 10 | 120 | 128 | 8 |

When the number of low-power stations to be woken up is 3 or 4, the exact structure of the frame body may not be identified by the length present field and the length/miscellaneous field. Also, when the number of low-power stations to be woken up is 7 or 8, the exact structure of the frame body may not be identified by the length present field and the length/miscellaneous field. In this case, when a decoding result of a specific part of the frame body is a padding bit, the low-power station may determine that the specific part of the frame body is not a sub ID field. Here, the padding bit may be set to 0. For example, when the length/miscellaneous field of the MU WUR wake-up frame is set to 2, the low-power station may obtain 3 IDs by decoding the frame body, and consider bits set to 0 to be the padding bits.

On the other hand, when the frame body is configured in units of 1 byte and the number of low-power stations to be woken up is odd, the size of the padding bits included in the frame body may be 4 bits. When the frame body is configured in units of 1 byte and the number of low-power stations to be woken up is even, the frame body may not include the padding bit. Alternatively, when the frame body is configured in units of a bit, the frame body may not include the padding bit.

Meanwhile, the TD control field included in the MU WUR wake-up frame may be used as a sub ID field. When the number of low-power stations to be woken up is 2 or more, the ID of one low-power station may be included in the TD control field of the MU WUR wake-up frame, and the IDs of the remaining low-power stations may be included in the frame body of the MU WUR wake-up frame. In this case, the size of the frame body may be reduced.

Method of Indicating the Size of Frame Body Included in MU WUR Wake-Up Frame

The size of the frame body of the MU WUR wake-up frame may be indicated by the TD control field. For example, the MU WUR wake-up frame may be configured based on Table 5 below. In Table 5, the items indicated as '−' may be set to a specific value according to the IEEE 802.11ba standard.

TABLE 5

| MAC header | | | | | | | | |
|---|---|---|---|---|---|---|---|---|
| Frame control | | | | | | | | |
| Type | Protected | Length present | Length/ miscellaneous | ID | TD control | Frame body | FCS |
| — | — | 1 | 0 | 0 | Length of frame body or number of LP STAs | IDs of LP STAs | — |

When the length present field is set to 1 and the length/miscellaneous field is set to 0, the TD control field may be used to indicate the size of the frame body. When the maximum size of the frame body is configured, specific bits in the TD control field may be used to indicate the size of the frame body, and the remaining bits excluding the specific bits in the TD control field may be used for other purposes. For example, when the maximum size of the frame body is 16 octets, 7 bits or 8 bits in the front part of the TD control field may be used to indicate the size of the frame body. When the frame body is configured in units of a bit, the TD control field may be set to (the size of frame body+1).

Alternatively, the TD control field may be used to indicate the number of low-power stations that are wake-up targets. When the maximum number of low-power stations to be woken up is configured, specific bits in the TD control field may be used to indicate the number of low-power stations, and the remaining bits excluding the specific bits in the TD control field may be used for other purposes. For example, 3 bits or 4 bits in the front part of the TD control field may be used to indicate the number of low-power stations. The TD control field may be set to (the number of low-power stations+1). Alternatively, when the length/miscellaneous field is set to 0 and the TD control field is set to 0, the low-power station may interpret the frame body as being 2 octets in length.

On the other hand, when the MU WUR wake-up frame is configured in octet units, the TD control field may indicate the size of the frame body in octets. In this case, the padding bits may be included in the frame body, and the length of the padding bits may be 4 bits.

When the TD control field indicates the size of the frame body in octet units and the maximum size of the frame body is configured, specific bits in the TD control field may be used to indicate the size of the frame body, and the remaining bits excluding the specific bits may be used for other purposes. For example, when the maximum size of the frame body is 16 octets, 4 bits or 5 bits of the TD control field may be used to indicate the size of the frame body. The TD control field may be set to (the size of frame body+1). Alternatively, when the length/miscellaneous field is set to 0 and the TD control field is set to 0, the low-power station may interpret the frame body as being 2 octets in length.

On the other hand, the MU WUR wake-up frame described above may be introduced in the embodiment shown in FIG. 19. In this case, the access point may transmit the MU WUR wake-up frame 1901 instead of the WUR wake-up frame that wakes up one low-power station. The WURx of the low-power station may receive the MU WUR wake-up frame 1901 and wake up the PCR when the ID of the low-power station equals the ID included in the frame body of the MU WUR wake-up frame 1901.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A low-power station in a communication system, the low-power station comprising:
a processor;
a memory storing at least one instruction executable by the processor;
a receiver for receiving a wake-up radio (WUR) physical protocol data unit (PPDU) according to the at least one instruction; and
a transceiver for transmitting and receiving a legacy PPDU according to the at least one instruction,
wherein, when executed by the processor, the at least one instruction is configured to:
cause the receiver to receive a WUR wake-up frame from an access point in an on-duration within a WUR duty cycle period, the WUR wake-up frame being used for waking up a plurality of low-power stations, a medium access control (MAC) header of the WUR wake-up frame including information indicating a number of the plurality of low-power stations, and a frame body of the WUR wake-up frame including an identifier (ID) of each of the plurality of low-power stations;
when the WUR wake-up frame is received, cause the processor to identify that a first ID of the low-power station is included in the frame body of the WUR wake-up frame;
when the WUR wake-up frame includes the first ID of the low-power station, cause the processor to transmit a first signal requesting wake-up to the transceiver; and
when the first signal is received, cause the transceiver to transition from a sleep state to a wake-up state at a target wake time (TWT) configured between the access point and the low-power station.

2. The low-power station according to claim 1, wherein the at least one instruction is further configured to cause the transceiver to transmit to the access point first information indicating that the low-power station supports a TWT function.

3. The low-power station according to claim 1, wherein the at least one instruction is further configured to cause the transceiver to transmit to the access point second information requesting to perform a TWT operation, and the second information is transmitted in a negotiation procedure for a WUR mode between the access point and the low-power station.

4. The low-power station according to claim 1, wherein the at least one instruction is further configured to cause the transceiver to maintain the wake-up state for a TWT service period (SP) configured between the access point and the low-power station.

5. The low-power station according to claim 4, wherein the TWT and the TWT SP are configured in a negotiation procedure for a WUR mode between the access point and the low-power station.

6. The low-power station according to claim 4, wherein the at least one instruction is further configured to:
cause the transceiver to transmit and receive the legacy PPDU with the access point for the TWT SP; and when the TWT SP is terminated, cause the transceiver to transition from the wake-up state to the sleep state.

7. The low-power station according to claim 4, wherein the legacy PPDU is a non-high throughput (non-HT) PPDU, an HT PPDU, a very high throughput (VHT) PPDU, or a high efficiency (HE) PPDU.

8. The low-power station according to claim 1, wherein the WUR wake-up frame is received prior to a wake-up delay time of the transceiver from the TWT.

9. A low-power station in a communication system, the low-power station comprising:
a processor;
a memory storing at least one instruction executable by the processor;
a receiver for receiving a wake-up radio (WUR) physical protocol data unit (PPDU) according to the at least one instruction; and
a transceiver for transmitting and receiving a legacy PPDU according to the at least one instruction,
wherein, when executed by the processor, the at least one instruction is configured to:
cause the transceiver to transmit to a wake-up radio (WUR) mode request frame including first information requesting to perform a target wake time (TWT) operation to an access point;
cause the transceiver to receive a WUR mode approval frame including second information indicating that execution of the TWT operation is approved from the access point;
when a negotiation procedure for a WUR mode between the low-power station and the access point is completed, cause the transceiver to operate in a sleep state;
cause the processor to transmit to the transceiver a first signal requesting wake-up prior to a wake-up delay time of the transceiver from a TWT configured between the access point and the low-power station in the negotiation procedure for the WUR mode;
when the first signal is received, cause the transceiver to transition from the sleep state to a wake-up state at the TWT; and
cause the transceiver to maintain the wake-up state for a TWT service period (SP) configured between the access point and the low-power station.

10. The low-power station according to claim 9, wherein the at least one instruction is further configured to cause the transceiver to transmit to the access point third information indicating that the low-power station supports a TWT function.

11. The low-power station according to claim 9, wherein the TWT and the TWT SP are configured in the negotiation procedure for the WUR mode between the access point and the low-power station.

12. The low-power station according to claim 9, wherein the at least one instruction is further configured to:
cause the transceiver to transmit and receive the legacy PPDU with the access point for the TWT SP; and
when the TWT SP is terminated, cause the transceiver to transition from the wake-up state to the sleep state.

13. The low-power station according to claim 9, wherein the WUR wake-up frame is used for waking up a plurality of low-power stations, a medium access control (MAC) header of the WUR wake-up frame includes information indicating a number of the plurality of low-power stations, and a frame body of the WUR wake-up frame includes an identifier (ID) of each of the plurality of low-power stations.

14. An operation method of an access point, the operation method comprising:
receiving from a low-power station a wake-up radio (WUR) mode request frame including first information requesting to perform a target wake time (TWT) operation;
transmitting to the low-power station a WUR mode approval frame including second information indicating that execution of the TWT operation is approved; and
transmitting a WUR wake-up frame to the low-power station prior to a wake-up delay time of the low-power station from a TWT,
wherein the WUR wake-up frame is used for waking up a plurality of low-power stations, a medium access control (MAC) header of the WUR wake-up frame includes information indicating a number of the plurality of low-power stations, and a frame body of the WUR wake-up frame includes an identifier (ID) of each of the plurality of low-power stations.

15. The operation method according to claim 14, wherein the WUR mode approval frame further includes third information indicating the TWT and fourth information indicating a TWT service period (SP).

16. The operation method according to claim 15, further comprising transmitting and receiving a legacy physical protocol data unit (PPDU) with the low-power station for the TWT SP, and the legacy PPDU is a non-high throughput (non-HT) PPDU, an HT PPDU, a very high throughput (VHT) PPDU, or a high efficiency (HE) PPDU.

* * * * *